United States Patent
Wong et al.

(10) Patent No.: US 11,924,750 B2
(45) Date of Patent: Mar. 5, 2024

(54) APPARATUS AND METHODS FOR GENERATING AND DISTRIBUTING POLICY IN WIRELESS NETWORKS

(71) Applicant: Charter Communications Operating, LLC, St. Louis, MO (US)

(72) Inventors: Curt Wong, Bellevue, WA (US); Maulik Vaidya, Escondido, CA (US); Yildirim Sahin, Englewood, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

(21) Appl. No.: 17/861,802

(22) Filed: Jul. 11, 2022

(65) Prior Publication Data
US 2022/0353805 A1 Nov. 3, 2022

Related U.S. Application Data

(62) Division of application No. 16/791,352, filed on Feb. 14, 2020, now Pat. No. 11,388,662.

(51) Int. Cl.
*H04W 48/18* (2009.01)
*H04L 67/00* (2022.01)
(Continued)

(52) U.S. Cl.
CPC .............. *H04W 48/18* (2013.01); *H04L 67/00* (2013.01); *H04W 4/029* (2018.02); *H04W 16/14* (2013.01); *H04W 28/08* (2013.01); *H04W 48/16* (2013.01)

(58) Field of Classification Search
CPC ....... H04W 48/18; H04W 64/00; H04W 4/29; H04W 28/0226
(Continued)

(56) References Cited

U.S. PATENT DOCUMENTS 6,546,250 B1 * 4/2003 Turcotte ................ H04W 48/18
455/437
9,392,534 B2 7/2016 Vrbaski et al.
(Continued)

FOREIGN PATENT DOCUMENTS

CA 3065119 A1 8/2019
CN 102232318 A * 11/2011 ............. H04H 20/08
(Continued)

OTHER PUBLICATIONS

Behnam Dezfouli, Vahid Esmaeelzadeh, Jaykumar Sheth, Marjan Radi, "A Review of Software-Defined WLANs: Architectures and Central Control Mechanisms" Sep. 2018 (Year: 2018).*
(Continued)

Primary Examiner — William D Cumming
(74) Attorney, Agent, or Firm — Patent Beach PC

(57) ABSTRACT

Apparatus and methods for prioritizing spectrum and controlling data traffic steering within a wireless network. In one embodiment, the apparatus and methods provide enhanced wireless services which allow network operators to prioritize utilization of spectrum for their subscribers. In one variant, an enhanced 3GPP UE Route Selection Policy (URSP) framework is provided for a UE connected to 5G wireless network, which allows the UE to use one or more prioritized 3GPP spectrum Band Class(es) based on one or more selection criterion or preconditions. In another variant, UE location information is used to dynamically update a data traffic steering mode or other functionality of an enhanced ATSSS (Access Traffic Steering, Switching, and Splitting) rule framework is described for dynamic control of steering or routing functionality, including between 3GPP- and non-3GPP network accesses for the data traffic.

20 Claims, 29 Drawing Sheets

(51) Int. Cl.
*H04W 4/029* (2018.01)
*H04W 16/14* (2009.01)
*H04W 28/08* (2023.01)
*H04W 48/16* (2009.01)

(58) Field of Classification Search
USPC .......................................................... 455/437
See application file for complete search history.

(56) References Cited

U.S. PATENT DOCUMENTS

| | | | |
|---|---|---|---|
| 9,414,307 | B2 | 8/2016 | Vrbaski et al. |
| 9,681,362 | B2 | 6/2017 | Rune et al. |
| 9,712,539 | B2 * | 7/2017 | Salkini ................. H04L 63/102 |
| 9,775,154 | B2 | 9/2017 | Sundar et al. |
| 9,967,727 | B2 | 5/2018 | Gupta et al. |
| 10,063,566 | B2 * | 8/2018 | Salkini ................... H04N 23/80 |
| 10,679,381 | B2 * | 6/2020 | Salkini ................. H04W 64/00 |
| 10,679,382 | B2 * | 6/2020 | Salkini ................. H05K 999/99 |
| 10,797,805 | B1 | 10/2020 | Mirfakhraei et al. |
| 10,820,185 | B2 | 10/2020 | Faccin et al. |
| 10,827,360 | B2 | 11/2020 | Yu et al. |
| 10,856,131 | B2 | 12/2020 | Ryu et al. |
| 10,986,506 | B2 | 4/2021 | Velev |
| 10,999,787 | B2 | 5/2021 | Dao et al. |
| 11,057,771 | B2 * | 7/2021 | Salkini ................... H04H 20/59 |
| 11,388,662 | B2 * | 7/2022 | Wong ................ H04W 28/0226 |
| 2015/0119029 | A1 | 4/2015 | Scribano |
| 2015/0208326 | A1 | 7/2015 | Vrbaski et al. |
| 2015/0208335 | A1 | 7/2015 | Vrbaski et al. |
| 2016/0302136 | A1 | 10/2016 | Bergstrom et al. |
| 2017/0111910 | A1 | 4/2017 | Sundar et al. |
| 2017/0318028 | A1 * | 11/2017 | Salkini ................. H05K 999/99 |
| 2018/0270840 | A1 | 9/2018 | Griot et al. |
| 2018/0324577 | A1 | 11/2018 | Faccin et al. |
| 2018/0365862 | A1 * | 12/2018 | Salkini ...................... G06T 7/90 |
| 2019/0222489 | A1 | 7/2019 | Shan |
| 2019/0261185 | A1 | 8/2019 | Velev |
| 2019/0261260 | A1 | 8/2019 | Dao et al. |
| 2019/0306925 | A1 | 10/2019 | Iskander et al. |
| 2019/0342761 | A1 | 11/2019 | Yu et al. |
| 2019/0373441 | A1 | 12/2019 | Ryu et al. |
| 2020/0065999 | A1 * | 2/2020 | Salkini .................... H04J 13/00 |
| 2020/0154350 | A1 | 5/2020 | Dao et al. |
| 2020/0162919 | A1 | 5/2020 | Velev et al. |
| 2020/0296587 | A1 * | 9/2020 | Salkini ................. H05K 999/99 |
| 2020/0336513 | A1 | 10/2020 | Martin et al. |
| 2021/0105629 | A1 | 4/2021 | Yu et al. |
| 2021/0120454 | A1 | 4/2021 | Chennichetty et al. |
| 2021/0211883 | A1 | 7/2021 | Velev |
| 2021/0258868 | A1 * | 8/2021 | Wong ...................... H04L 67/00 |
| 2021/0337385 | A1 * | 10/2021 | Salkini ................ G06F 16/5838 |
| 2022/0353805 | A1 * | 11/2022 | Wong .................... H04W 48/16 |

FOREIGN PATENT DOCUMENTS

| | | | |
|---|---|---|---|
| WO | WO-2019192528 A1 | 10/2019 | |
| WO | WO-2019204166 A1 | 10/2019 | |
| WO | WO-2020037666 A1 | 2/2020 | |
| WO | WO-2021163590 A1 * | 8/2021 | ............. H04L 67/00 |
| WO | WO-2021163590 A4 | 10/2021 | |

OTHER PUBLICATIONS

3GPP Release-15 specification 3GPP TS 23.503 (e.g. v0.4.0) entitled "3rd Generation Partnership Project; Technical Specification Group Service and System Aspects; Policy and Charging Control Framework for the 5G System (Release 15)" dated Dec. 2017, 56 pages.
3GPP TS 23.501 V16.1.0. entitled "3rd Generation Partnership Project; Technical Specification Group Service and System Aspects; System Architecture for 5G System; Stage 2 (Release 16)" dated Jun. 2019, 450 pages.
Alipio M.I., et al., "SDN-Enabled Value-Based Traffic Management Mechanism in Resource-Constrained Sensor Devices," May 2019 International Conference on Information Networking (ICOIN), 2019, pp. 248-253 , doi: 10.1109/ICOIN.2019.8718140. (Year: 2019).
Deering, S., et al., "Internet Protocol, Version 6 (IPv6) Specification," Internet Engineering Task Force (IETF) RFC 2460, Dec. 1998, 39 pages.
"Internet Protocol, DARPA Internet Program, Protocol Specification", IETF RCF 791, Sep. 1981, 50 pages.
Kaveh S., et al., "WLAN-WiMAX Double-Technology Routing for Vehicular Networks," 2011 IEEE Vehicular Technology Conference (VTC Fall), pp. 1-6.
Nam H., et al., "Intelligent content delivery over wireless via SDN," 2015 IEEE Wireless Communications and Networking Conference (WCNC), 2015, pp. 2185-2190.
Signaling Protocols and Procedures for Citizens Broadband Radio Service (CBRS): Spectrum Access System, (SAS)—Citizens Broadband Radio Service Device (CBSD) Interface Technical Specification—Document WINNF-TS-0016, Version V1.2.1.3, Jan. 3, 2018, 60 pages.
3GPP TR 23.793 V2.0.1 (Dec. 2018); $3^{rd}$ Generation Partnership Project; Technical Specification Group Services and System Aspects; Study on Access Traffic Steering, Switching and Splitting Support in the 5G System Architecture; Release 16; 115 pages.
3GPP TS 23.502 V16.1.1 (Jun. 2019); $3^{rd}$ Generation Partnership Project; Technical Specification Group Services and System Aspects; Procedures for the 5G System; Stage 2; Release 16; 495 pages.

* cited by examiner

FIG. 2A (Prior Art)

| Information name | Description | Category | PCF permitted to modify in a URSP | Scope |
|---|---|---|---|---|
| URSP rules | 1 or more URSP rules as specified in table 6.6.2.1-2 | Mandatory | Yes | UE context |

FIG. 2B (Prior Art)

| Information name | | Description | Category | PCF permitted to modify in a UE context | Scope |
|---|---|---|---|---|---|
| Rule Precedence | | Determines the order the URSP rule is enforced in the UE. | Mandatory (NOTE 1) | Yes | UE context |
| Traffic descriptor | | *This part defines the Traffic descriptor components for the URSP rule.* | Mandatory (NOTE 3) | | |
| | Application descriptors | It consists of OSId and OSAppId(s). (NOTE 2) | Optional | Yes | UE context |
| | IP descriptors (NOTE 5) | Destination IP 3 tuple(s) (IP address or IPv6 network prefix, port number, protocol ID of the protocol above IP). | Optional | Yes | UE context |
| | Domain descriptors | Destination FQDN(s) | Optional | Yes | UE context |
| | Non-IP descriptors (NOTE 5) | Descriptor(s) for destination information of non-IP traffic | Optional | Yes | UE context |
| | DNN | This is matched against the DNN information provided by the application. | Optional | Yes | UE context |
| | Connection Capabilities | This is matched against the information provided by a UE application when it requests a network connection with certain capabilities. (NOTE 4) | Optional | Yes | UE context |
| List of Route Selection Descriptors | | A list of Route Selection Descriptors. The components of a Route Selection Descriptor are described in table 6.6.2.1-3. | Mandatory | | |
| NOTE 1: Rules in a URSP shall have different precedence values. | | | | | |
| NOTE 2: The information is used to identify the Application(s) that is(are) running on the UE's OS. The OSId does not include an OS version number. The OSAppId does not include a version number for the application. | | | | | |
| NOTE 3: At least one of the Traffic descriptor components shall be present. | | | | | |
| NOTE 4: The format and some values of Connection Capabilities, e.g. "ims", "mms", "internet", etc., are defined in TS 24.526 [19]. More than one connection capabilities value can be provided. | | | | | |
| NOTE 5: A URSP rule cannot contain the combination of the Traffic descriptor components IP descriptors and Non-IP descriptors. | | | | | |

FIG. 2C (Prior Art)

| Information name | Description | Category | PCF permitted to modify in URSP | Scope |
|---|---|---|---|---|
| Route Selection Descriptor Precedence | Determines the order in which the Route Selection Descriptors are to be applied. | Mandatory (NOTE 1) | Yes | UE context |
| Route selection components | *This part defines the route selection components* | Mandatory (NOTE 2) | | |
| SSC Mode Selection | One single value of SSC mode. (NOTE 5) | Optional | Yes | UE context |
| Network Slice Selection | Either a single value or a list of values of S-NSSAI(s). | Optional (NOTE 3) | Yes | UE context |
| DNN Selection | Either a single value or a list of values of DNN(s). | Optional | Yes | UE context |
| PDU Session Type Selection | One single value of PDU Session Type | Optional | Yes | UE context |
| Non-Seamless Offload indication | Indicates if the traffic of the matching application is to be offloaded to non-3GPP access outside of a PDU Session. | Optional (NOTE 4) | Yes | UE context |
| Access Type preference | Indicates the preferred Access Type (3GPP or non-3GPP or Multi-Access) when the UE establishes a PDU Session for the matching application. | Optional | Yes | UE context |
| Route Selection Validation Criteria (NOTE 6) | *This part defines the Route Validation Criteria components* | Optional | | |
| Time Window | The time window when the matching traffic is allowed. The RSD is not considered to be valid if the current time is not in the time window. | Optional | Yes | UE context |
| Location Criteria | The UE location where the matching traffic is allowed. The RSD rule is not considered to be valid if the UE location does not match the location criteria. | Optional | Yes | UE context |

NOTE 1: Every Route Selection Descriptor in the list shall have a different precedence value.
NOTE 2: At least one of the route selection components shall be present.
NOTE 3: When the Subscription Information contains only one S-NSSAI in UDR, the PCF needs not provision the UE with S-NSSAI in the Network Slice Selection information. The "match all" URSP rule has one S-NSSAI at most.
NOTE 4: If this indication is present in a Route Selection Descriptor, no other components shall be included in the Route Selection Descriptor.
NOTE 5: The SSC Mode 3 shall only be used when the PDU Session Type is IP.
NOTE 6: The Route Selection Descriptor is not considered valid unless all the provided Validation Criteria are met.
NOTE 7: In this Release of specification, inclusion of the Validation Criteria in Roaming scenarios is not considered.
NOTE 8: When the PDU Session Type is "Ethernet" or "Unstructured", this component shall be present.

| Information name | Description | Category | SMF permitted to modify in a PDU context | Scope |
|---|---|---|---|---|
| Rule Precedence | Determines the order in which the ATSSS rule is evaluated in the UE. | Mandatory (NOTE 1) | Yes | PDU context |
| Traffic Descriptor | *This part defines the Traffic descriptor components for the ATSSS rule.* | Mandatory (NOTE 2) | | |
| Application descriptors | One or more application identities that identify the application(s) generating the traffic (NOTE 3). | Optional | Yes | PDU context |
| IP descriptors (NOTE 4) | One or more 5-tuples that identify the destination of IP traffic. | Optional | Yes | PDU context |
| Non-IP descriptors (NOTE 4) | One or more descriptors that identify the destination of non-IP traffic, i.e. of Ethernet traffic. | Optional | Yes | PDU context |
| Access Selection Descriptor | *This part defines the Access Selection Descriptor components for the ATSSS rule.* | Mandatory | | |
| Steering Mode | Identifies the steering mode that should be applied for the matching traffic. | Mandatory | Yes | PDU context |
| Steering Functionality | Identifies whether the MPTCP functionality or the ATSSS-LL functionality should be applied for the matching traffic. | Optional (NOTE 5) | Yes | PDU context |
| NOTE 1: Each ATSSS rule has a different precedence value from the other ATSSS rules. | | | | |
| NOTE 2: At least one of the Traffic Descriptor components is present. | | | | |
| NOTE 3: An application identity consists of an OSId and an OSAppId. | | | | |
| NOTE 4: An ATSSS rule cannot contain both IP descriptors and Non-IP descriptors. | | | | |
| NOTE 5: If the UE supports only one Steering Functionality, this component is omitted. | | | | |

FIG. 3 (Prior Art)

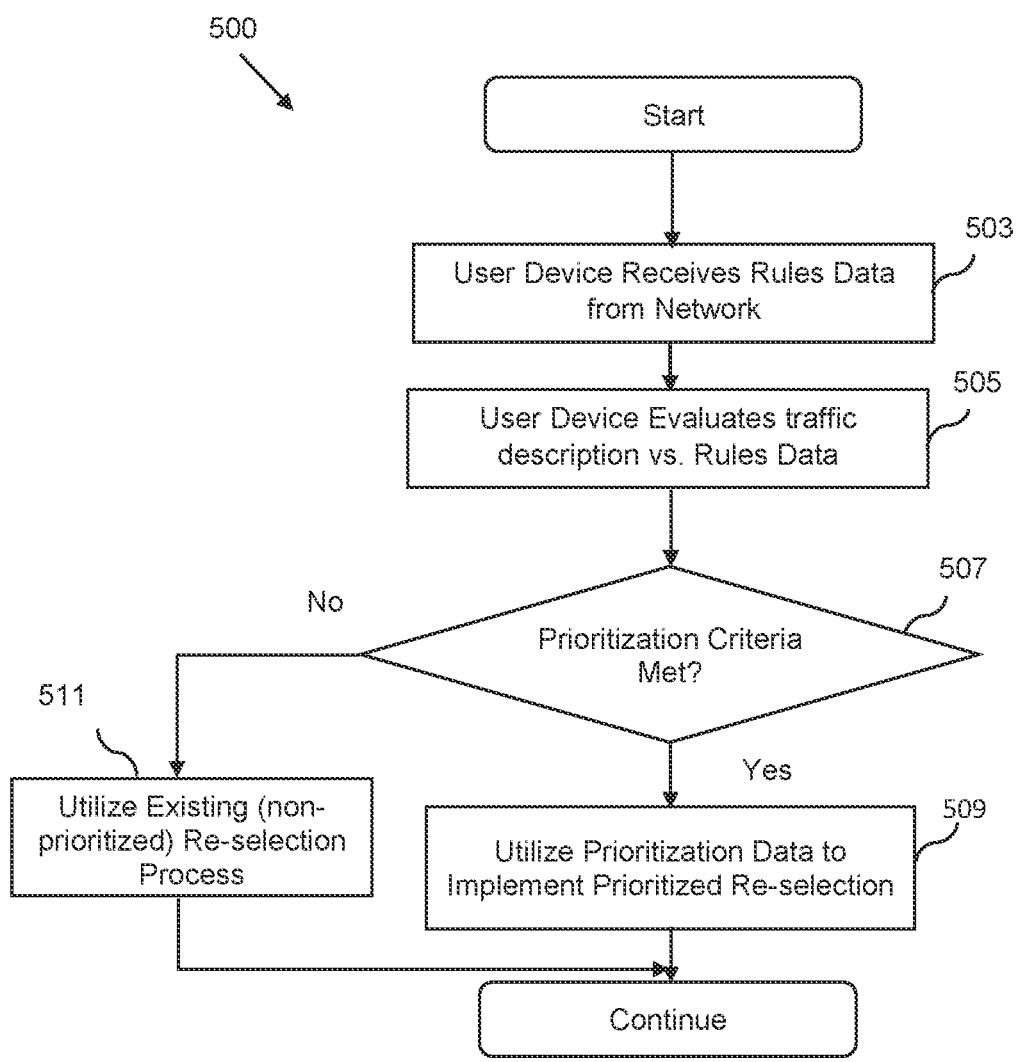

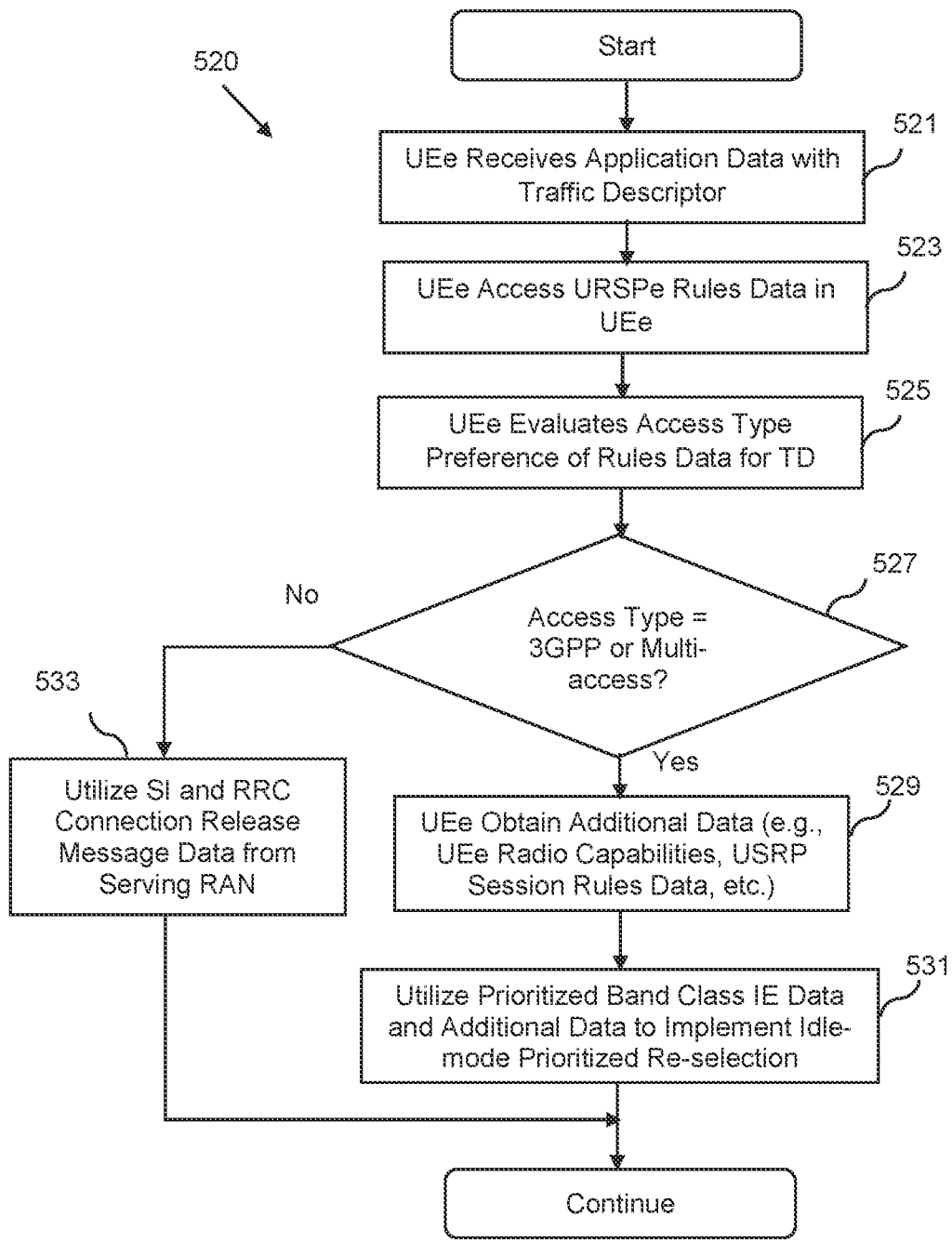

| Information name | Description | Category | PCF permitted to modify in URSP | Scope |
|---|---|---|---|---|
| Route Selection Descriptor Precedence | Determines the order in which the Route Selection Descriptors are to be applied. | Mandatory (NOTE 1) | Yes | UE context |
| Route selection components | *This part defines the route selection components* | Mandatory (NOTE 2) | | |
| SSC Mode Selection | One single value of SSC mode. (NOTE 5) | Optional | Yes | UE context |
| Network Slice Selection | Either a single value or a list of values of S-NSSAI(s). | Optional (NOTE 3) | Yes | UE context |
| DNN Selection | Either a single value or a list of values of DNN(s). | Optional | Yes | UE context |
| PDU Session Type Selection | One single value of PDU Session Type | Optional | Yes | UE context |
| Non-Seamless Offload indication | Indicates if the traffic of the matching application is to be offloaded to non-3GPP access outside of a PDU Session. | Optional (NOTE 4) | Yes | UE context |
| Access Type preference | Indicates the preferred Access Type (3GPP or non-3GPP or Multi-Access) when the UE establishes a PDU Session for the matching application. | Optional | Yes | UE context |
| Route Selection Validation Criteria (NOTE 6) | *This part defines the Route Validation Criteria components* | Optional | | |
| Time Window | The time window when the matching traffic is allowed. The RSD is not considered to be valid if the current time is not in the time window. | Optional | Yes | UE context |
| Location Criteria | The UE location where the matching traffic is allowed. The RSD rule is not considered to be valid if the UE location does not match the location criteria. | Optional | Yes | UE context |
| Prioritized 3GPP Band Class(es) | Indicates prioritized 3GPP band class(es) if the Access Type preference is 3GPP or Multi-Access | Optional | Yes | UE context |

NOTE 1: Every Route Selection Descriptor in the list shall have a different precedence value.
NOTE 2: At least one of the route selection components shall be present.
NOTE 3: When the Subscription Information contains only one S-NSSAI in UDR, the PCF needs not provision the UE with S-NSSAI in the Network Slice Selection information. The "match all" URSP rule has one S-NSSAI at most.
NOTE 4: If this indication is present in a Route Selection Descriptor, no other components shall be included in the Route Selection Descriptor.
NOTE 5: The SSC Mode 3 shall only be used when the PDU Session Type is IP.

FIG. 6

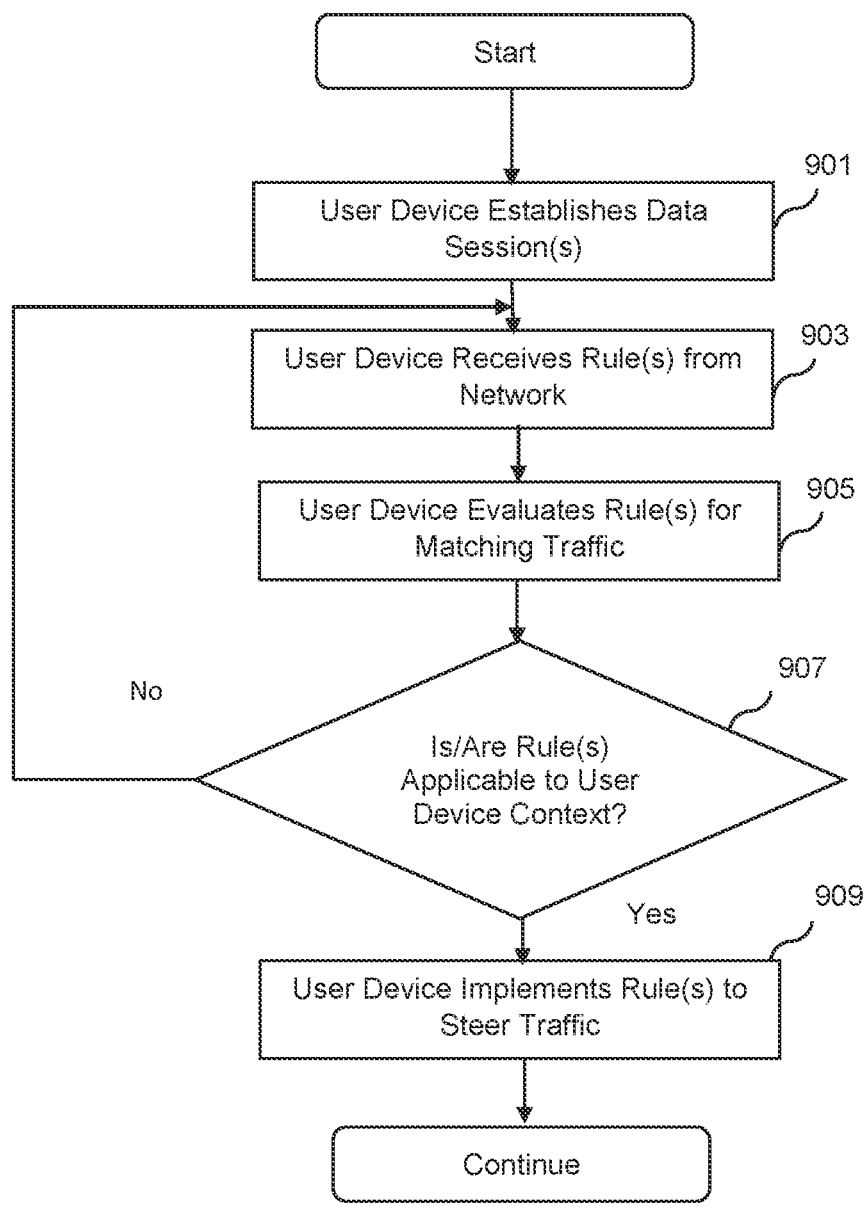

| Information name | Description | Category | SMF permitted to modify in a PDU context | Scope |
|---|---|---|---|---|
| Rule Precedence | Determines the order in which the ATSSS rule is evaluated in the UE. | Mandatory (NOTE 1) | Yes | PDU context |
| Traffic Descriptor | *This part defines the Traffic descriptor components for the ATSSS rule.* | Mandatory (NOTE 2) | | |
| Application descriptors | One or more application identities that identify the application(s) generating the traffic (NOTE 3). | Optional | Yes | PDU context |
| IP descriptors (NOTE 4) | One or more 5-tuples that identify the destination of IP traffic. | Optional | Yes | PDU context |
| Non-IP descriptors (NOTE 4) | One or more descriptors that identify the destination of non-IP traffic, i.e. of Ethernet traffic. | Optional | Yes | PDU context |
| Access Selection Descriptor | *This part defines the Access Selection Descriptor components for the ATSSS rule.* | Mandatory | | |
| Steering Mode | Identifies the steering mode that should be applied for the matching traffic. | Mandatory | Yes | PDU context |
| Steering Functionality | Identifies whether the MPTCP functionality or the ATSSS-LL functionality should be applied for the matching traffic. | Optional (NOTE 5) | Yes | PDU context |
| Access Selection Criteria | This part defines the Access Selection criteria component | Optional | Yes | PDU context |
| 3GPP Band Class(es) | Indicates the 3GPP band class(es) that the Access Selection is considered to be valid for the matching traffic. 3GPP band class(es) is the one(s) that UE utilizes in serving 3GPP radio access node. | Optional (NOTE X) | Yes | PDU context |
| UE Location | Indicates UE locations (i.e. TAIs) that the Access Selection is considered applicable for the matching traffic. | Optional (NOTE X) | No | PDU Context |

NOTE 1: Each ATSSS rule has a different precedence value from the other ATSSS rules.
NOTE 2: At least one of the Traffic Descriptor components is present.
NOTE 3: An application identity consists of an OSId and an OSAppId.
NOTE 4: An ATSSS rule cannot contain both IP descriptors and Non-IP descriptors.
NOTE 5: If the UE supports only one Steering Functionality, this component is omitted.
NOTE X: Access Selection Criteria cannot contain both 3GPP Band Class(es) and UE Location.

FIG. 10

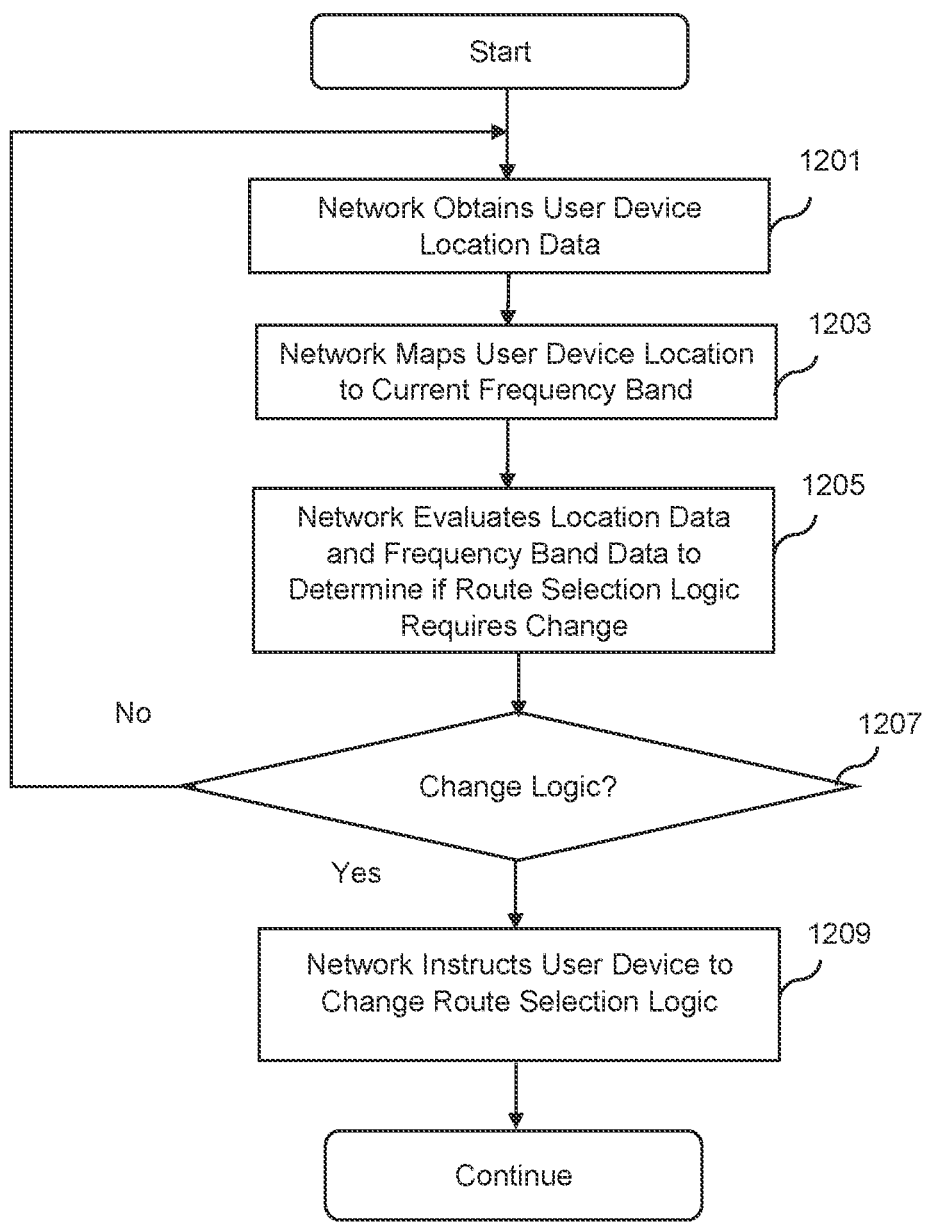

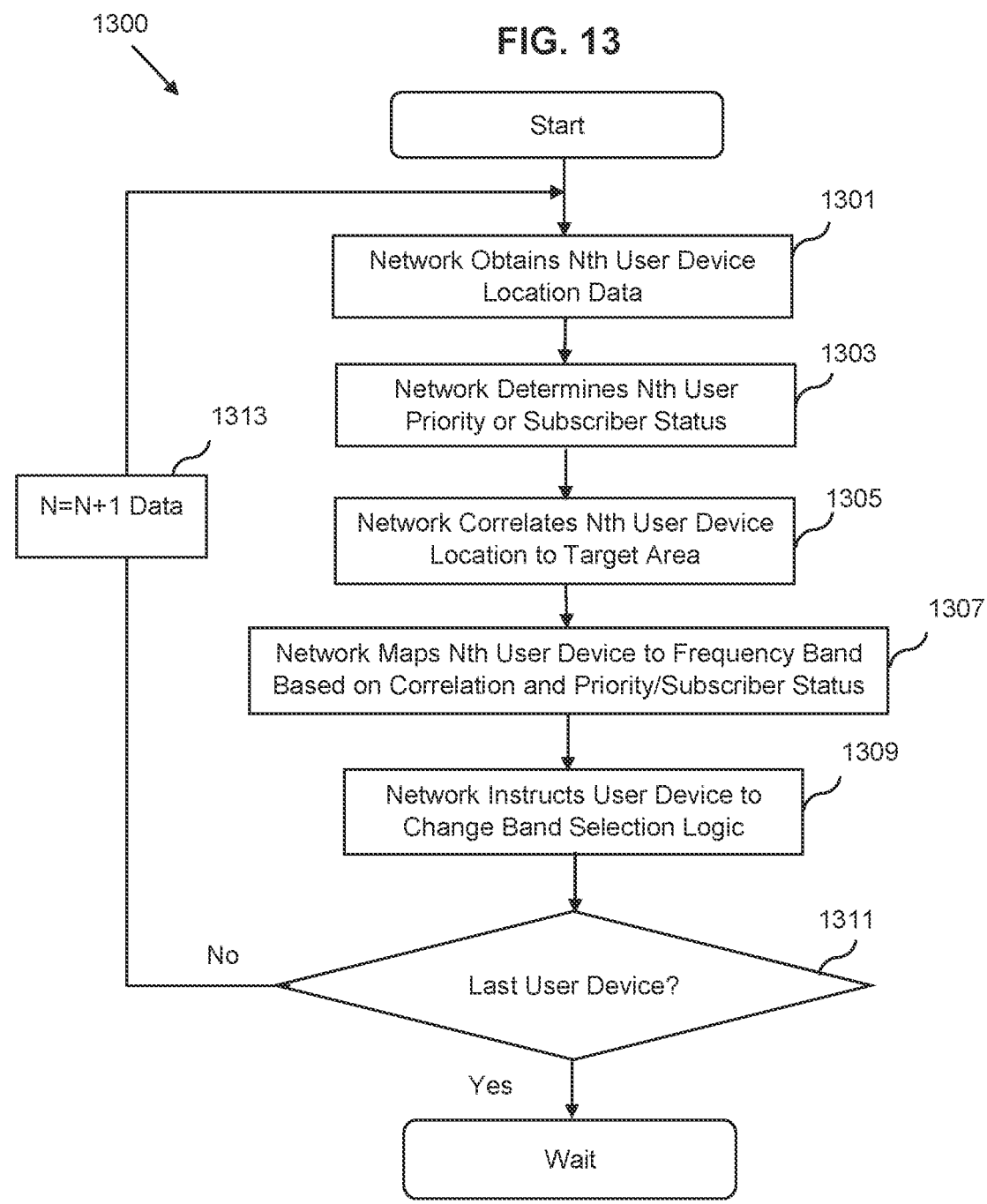

APPARATUS AND METHODS FOR GENERATING AND DISTRIBUTING POLICY IN WIRELESS NETWORKS

PRIORITY

This application is a divisional of, and claims priority to, co-owned and co-pending U.S. patent application Ser. No. 16/791,352 of the same title filed on Feb. 14, 2020, and issuing as U.S. Pat. No. 11,388,662 on Jul. 12, 2022, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of wireless devices and networks thereof, and specifically in one exemplary aspect to enhanced specification and distribution of policies or rules relating to prioritized band class(es) within in a radio network utilizing licensed, quasi-licensed, and/or unlicensed spectrum.

2. Description of Related Technology

A multitude of wireless networking technologies, also known as Radio Access Technologies ("RATs"), provide the underlying means of connection for radio-based communication networks to user devices. Such RATs often utilize licensed radio frequency spectrum (i.e., that allocated by the FCC per the Table of Frequency Allocations as codified at Section 2.106 of the Commission's Rules). Currently only frequency bands between 9 kHz and 275 GHz have been allocated (i.e., designated for use by one or more terrestrial or space radio communication services or the radio astronomy service under specified conditions). For example, a typical cellular service provider might utilize spectrum for so-called "3G" (third generation) and "4G" (fourth generation) wireless communications as shown in Table 1 below:

TABLE 1

| Technology | Bands |
|---|---|
| 3G | 850 MHZ Cellular, Band 5 (GSM/GPRS/EDGE). |
| | 1900 MHZ PCS, Band 2 (GSM/GPRS/EDGE). |
| | 850 MHz Cellular, Band 5 (UMTS/GPS+ to 21 Mbits/s) |
| | 1900 MHz PCS, Band 2 (UMTS/HSPA+ up to 21 Mbits/s) |
| 4G | 700 MHz Lower B/C, Band 12/17 (LTE). |
| | 850 MHz Cellular, Band 5 (LTE). |
| | 1700/2100 MHz AWS, Band 4 (LTE). |
| | 1900 MHz PCS, Band 2 (LTE). |
| | 2300 MHz WCS, Band 30 (LTE). |

Alternatively, unlicensed spectrum may be utilized, such as that within the so-called ISM-bands. The ISM bands are defined by the ITU Radio Regulations (Article 5) in footnotes 5.138, 5.150, and 5.280 of the Radio Regulations. In the United States, uses of the ISM bands are governed by Part 18 of the Federal Communications Commission (FCC) rules, while Part 15 contains the rules for unlicensed communication devices, even those that share ISM frequencies. Table 2 below shows typical ISM frequency allocations:

TABLE 2

| Frequency range | Type | Center frequency | Availability | Licensed users |
|---|---|---|---|---|
| 6.765 MHz-6.795 MHz | A | 6.78 MHz | Subject to local acceptance | Fixed service & mobile service |
| 13.553 MHz-13.567 MHz | B | 13.56 MHz | Worldwide | Fixed & mobile services except aeronautical mobile (R) service |
| 26.957 MHz-27.283 MHz | B | 27.12 MHz | Worldwide | Fixed & mobile service except aeronautical mobile service, CB radio |
| 40.66 MHz-40.7 MHz | B | 40.68 MHz | Worldwide | Fixed, mobile services & earth exploration-satellite service |
| 433.05 MHz-434.79 MHz | A | 433.92 MHz | only in Region 1, subject to local acceptance | amateur service & radiolocation service, additional apply the provisions of footnote 5.280 |
| 902 MHz-928 MHz | B | 915 MHz | Region 2 only (with some exceptions) | Fixed, mobile except aeronautical mobile & radiolocation service; in Region 2 additional amateur service |
| 2.4 GHz-2.5 GHz | B | 2.45 GHz | Worldwide | Fixed, mobile, radiolocation, amateur & amateur-satellite service |
| 5.725 GHz-5.875 GHz | B | 5.8 GHz | Worldwide | Fixed-satellite, radiolocation, mobile, amateur & amateur-satellite service |

TABLE 2-continued

| Frequency range | Type | Center frequency | Availability | Licensed users |
|---|---|---|---|---|
| 24 GHz-24.25 GHz | B | 24.125 GHz | Worldwide | Amateur, amateur-satellite, radiolocation & earth exploration-satellite service (active) |
| 61 GHz-61.5 GHz | A | 61.25 GHz | Subject to local acceptance | Fixed, inter-satellite, mobile & radiolocation service |
| 122 GHz-123 GHz | A | 122.5 GHz | Subject to local acceptance | Earth exploration-satellite (passive), fixed, inter-satellite, mobile, space research (passive) & amateur service |
| 244 GHz-246 GHz | A | 245 GHz | Subject to local acceptance | Radiolocation, radio astronomy, amateur & amateur-satellite service |

ISM bands are also been shared with (non-ISM) license-free communications applications such as wireless sensor networks in the 915 MHz and 2.450 GHz bands, as well as wireless LANs (e.g., Wi-Fi) and cordless phones in the 915 MHz, 2.450 GHz, and 5.800 GHz bands.

Additionally, the 5 GHz band has been allocated for use by, e.g., WLAN equipment, as shown in Table 3:

TABLE 3

| Band Name | Frequency Band | Dynamic Freq. Selection Required (DFS)? |
|---|---|---|
| UNII-1 | 5.15 to 5.25 GHz | No |
| UNII-2 | 5.25 to 5.35 GHz | Yes |
| UNII-2 Extended | 5.47 to 5.725 GHz | Yes |
| UNII-3 | 5.725 to 5.825 GHz | No |

User client devices (e.g., smartphone, tablet, phablet, laptop, smartwatch, or other wireless-enabled devices, mobile or otherwise) generally support multiple RATs that enable the devices to connect to one another, or to networks (e.g., the Internet, intranets, or extranets), often including RATs associated with both licensed and unlicensed spectrum. In particular, wireless access to other networks by client devices is made possible by wireless technologies that utilize networked hardware, such as a wireless access point ("WAP" or "AP"), small cells, femtocells, or cellular towers, serviced by a backend or backhaul portion of service provider network (e.g., a cable network). A user may generally access the network at a node or "hotspot," a physical location at which the user may obtain access by connecting to modems, routers, APs, etc. that are within wireless range. 5G New Radio (NR) and NG-RAN (Next Generation Radio Area Network)

NG-RAN or "NextGen RAN (Radio Access Network)" is part of the 3GPP "5G" next generation radio system. 3GPP is currently specifying Release 16 NG-RAN, its components, and interactions among the involved nodes including so-called "gNBs" (next generation Node B's or eNBs). NG-RAN will provide high-bandwidth, low-latency wireless communication and efficiently utilize, depending on application, both licensed and unlicensed spectrum of the type described supra in a wide variety of deployment scenarios, including indoor "spot" use, urban "macro" (large cell) coverage, rural coverage, use in vehicles, and "smart" grids and structures. NG-RAN will also integrate with 4G/4.5G systems and infrastructure, and moreover new LTE entities are used (e.g., an "evolved" LTE eNB or "eLTE eNB" which supports connectivity to both the EPC (Evolved Packet Core) and the NR "NGC" (Next Generation Core), a.k.a. 5GC (5G Core).

In some aspects, Release 16 and its predecessor Release 15, leverage technology and functions of extant LTE/LTE-A technologies (colloquially referred to as 4G or 4.5G), as bases for further functional development and capabilities. FIG. 1 illustrates the 3GPP-5GS (5G System) architecture 100 at a high level, including various interfaces between elements of the architecture.

Policy Functions—

Both 3GPP Release 15 and Release 16 specify mechanisms for implementing different network policy rules or functions. For instance, 3GPP Release-15 specification 3GPP TS23.503 (e.g. v0.4.0) entitled "3rd Generation Partnership Project; Technical Specification Group Service and System Aspects; Policy and Charging Control Framework for the 5G System (Release 15)" dated December 2017, which is incorporated herein by reference in its entirety, specifies UE policy information including a UE Route Selection Policy (URSP), which can be sent to the UE by the Policy Control Function (PCF) 102 of the 5G-Core (5GC) of the network (i.e. Public Land Mobile Network (PLMN)), or may be pre-configured locally in the UE 104 (see FIG. 1).

As described in TS23.503 (section 6.1.2.2.1), UE Route Selection Policy (URSP) information contains a list of prioritized Session Management (SM) policy rules, where each rule may have one or more traffic descriptor (TD) components associated with one or more route selection components. The UE uses these rules to determine if one or more detected traffic descriptors can be associated to an established PDU session, can be off-loaded to non 3GPP access, or can be used to establish a new PDU session. See FIGS. 2A-2C herein, reproduced from Tables 6.6.2.1-1, 6.6.2.1-2, and 6.6.2.1-3 respectively of 3GPP TS23.503.

Moreover, 3GPP TS 23.503 describes the details of delivering a new and/or updated URSP information to the UE (URSP is UE Specific). The structure and components of URSP is specified in Section 6.6.2 of 3GPP TS 23.503.

3GPP Release-16 further introduces a "steering functionality," namely the Access Traffic Steering, Switching, and Splitting (ATSSS) function, which enables an ATSSS-capable UE to steer, switch and split Multi-Access (MA) PDU session traffic across a 3GPP access 302 and a non-3GPP access 304 (see FIG. 3A). The rules governing ATSSS operation are sent from the Policy Control Function (PCF) 102 (FIG. 1) to the Session Management Function (SMF) 106, and from the SMF to UE 104 during Multi-Access (MA) Protocol Data Unit (PDU) operation. ATSSS rules contain a list of prioritized rules; each ATSSS rule consists of a Rule Precedence, and one or more Traffic Descriptors associated with Access Selection Descriptors. The Access Traffic Descriptor (ATD) contains mandatory steering mode information (e.g. Active-Standby, Smallest Delay, Load-Balancing, or Priority-Based), and optional Steering Functionality information (i.e., Multipath TCP (MPTCP) or ATSSS-LL). See FIG. 3 herein, which illustrates ATSSS information elements and structure, from Table 5.32.8-1 specified in 3GPP TS 23.501 V16.1.0. entitled "3rd Generation Partnership Project; Technical Specification Group Service and System Aspects; System Architecture for 5G System; Stage 2 (Release 16)" dated June 2019, which is incorporated herein by reference in its entirety. ATSSS rules for a given PDU session may be updated during the lifetime of the session; see 3GPP TS 23.501.

UEs and the radio network nodes need to support frequency bands as specified in 3GPP standards. Exemplary 3GPP specified spectrum bands can be found in, inter alia, 3GPP TS 36.101 for E-UTRA, 3GPP TS 38.101-1 3GPP TS 38.104 for NR; see Appendix A hereto). The first column in each table of Appendix A indicates the "NR operating band," which is referenced herein as either "spectrum band" or "frequency band."

As will be appreciated, frequency spectrum is a key asset for the wireless industry and service providers in general. As more and more consumer platforms both utilize wireless interfaces and are mobile in nature (e.g., WLAN- or cellular-enabled smartphones or tablets), an increasing utilization of available spectrum has emerged. In that licensed spectrum (e.g., Advanced Wireless Spectrum, or AWS) is a limited pool—and generally a high-cost element of the wireless infrastructure which may not be available to many service providers—many providers are making increased utilization of unlicensed and quasi-licensed or "licensed by rule" spectrum (e.g., that which may be subject to certain restrictions, such as in the case of Citizens Broadband Radio Service or CBRS spectrum in the U.S.). As such, efficient utilization of such scarce radio resources plays an important role for the operational success of wireless operators and other service providers.

Unaddressed Spectrum Management Issues—

Depending on the type of the spectrum, the cost (e.g. purchasing and operation) of a spectrum band may vary. For example, while fully-licensed/AWS spectrum is more expensive to procure than quasi-licensed and/or unlicensed spectrum, the cost of each fully-licensed spectrum band may also vary.

Moreover, with quasi-licensed spectrum such as for example CBRS, different levels or tiers of spectrum exist, such as shown in FIGS. 4 and 4A. Specifically, incumbent Access (existing DOD and satellite) users 402 include authorized federal and grandfathered Fixed Satellite Service (FSS) users currently operating in the 3.5 GHz band shown in FIG. 4. These users are protected from harmful interference from Priority Access License (PAL) and General Authorized Access (GAA) users. The sensor networks, operated by Environmental Sensing Capability (ESC) operators, make sure that incumbents and others utilizing the spectrum are protected from interference.

Further, licensed spectrum it typically allocated to a given geographic area, and other types of spectrum such as unlicensed or quasi-licensed may not be so constrained. For instance, under typical licensed spectrum paradigms, a given operator will be given rights to exclusively use a given portion of the spectrum within their particular coverage area(s), to the exclusion of other licensed spectrum operators. However, such is not the case with unlicensed and portions of the quasi-licensed spectrum; multiple operators may overlap, including in frequency, and in some cases simultaneously. For instance, in a CBRS PAL license, the licensed operator may have the grant to the PAL spectrum for only a finite period of time, after which it relinquished. Even further, in GAA, the grants may be highly limited in duration and can change appreciably with time.

The Priority Access tier 404 (including acquisition of spectrum for up to three years through an auction process) consists of Priority Access Licenses (PALs) that are assigned using competitive bidding within the 3550-3650 MHz portion of the band. Each PAL is defined as a non-renewable authorization to use a 10 MHz channel in a single census tract for three years. Up to seven (7) total PALs may be assigned in any given census tract, with up to four PALs going to any single applicant. Applicants may acquire up to two-consecutive PAL terms in any given license area during the first auction.

The General Authorized Access tier 406 (for any user with an authorized 3.5 GHz device) is licensed-by-rule to permit open, flexible access to the band for the widest possible group of potential users. General Authorized Access (GAA) users are permitted to use any portion of the 3550-3700 MHz band not assigned to a higher tier user and may also operate opportunistically on unused Priority Access License (PAL) channels. See FIG. 4A.

Notably, PAL spectrum within the CBRS model is the "cleaner" (more preferred due to, inter alia, being more interference-free) option, but as indicated above, is not generally ubiquitous as is GAA spectrum.

Based on the foregoing, operators and service providers may prefer different spectrum band assignment/usage policies for their subscribers depending on the type of spectrum deployed in the service area of interest.

Moreover, other factors in addition to cost may be considered by a particular operator when choosing to use one spectrum over another for a given application or individual UE, including those relating to operation and location of the UE when the service is requested/provided. In the exemplary context of 3GPP URSP rules previously described, such rules may include an Access Type component, which indicates a preferred access type (i.e., 3GPP 302, or non-3GPP 304, or Multi-Access—see FIG. 3A) for the matching Traffic Descriptor. In the case where the Access Type preference in a given rule is indicated as "3GPP" or "Multi-Access," the 3GPP specifications do not provide any data regarding preference and/or prioritization of spectrum or band class(es) that the UE should utilize to transmit or receive data using the PDU session associated with the traffic. This can lead to, among other things, non-optimal utilization of spectrum, including for instance: (i) overcrowding of a given type of spectrum or band, since all UE of the service provider may default to the same type/band; (ii) increased resource contention; and/or (iii) utilization of higher cost spectrum (whether for the service provider or the user of the UE, or both).

Similarly, for the extant ATSSS rule framework described above, no provision for band preference or prioritization for ATSSS rules currently exists.

Further, spectrum availability, allocation, and utilization by a given UE is highly dynamic in many contexts, such as in CBRS. A given UE within a given area may be allocated time/frequency resources within the underlying 3GPP protocols based on a temporary spectrum grant from a SAS, with the allocation being revocable (subject to withdrawal)

and to some degree based on the then-current location of the UE. As spectrum is withdrawn, and the UE moves (including across a service boundary of a given service provider), new spectrum grants must be requested and allocated by the SAS.

Accordingly, there exists a need for improved methods and apparatus to, among other things, add or enhance existing rule frameworks to include mechanisms for preference or prioritization of operational aspects such as operating frequency bands or allocation of other resources.

SUMMARY

The present disclosure addresses the foregoing needs by providing, inter alia, methods and apparatus for prioritization of frequency bands or other parameters, such as for example those supported by a 3GPP 5G NR protocols.

In one aspect of the disclosure, an enhanced rules framework for use within a wireless network is disclosed. In one embodiment, the wireless network utilizes 3GPP 5G System (5GS) protocols, and the rules framework enables specification of one or more parameters relating to frequency band usage or prioritization for user devices (UEs) within the network. In one variant, the prioritization is implemented via a modified 3GPP URSP framework, or alternatively a modified ATSSS framework, via specification of new information element (IE) data within those frameworks.

In one implementation, the network is operated by a multiple systems operator (MSO), and is configured to utilize at least quasi-licensed and unlicensed spectrum.

In another implementation, the extant 3GPP ATSSS rule framework is enhanced to include one or more 3GPP Band Class(es) and/or UE Location components as a precondition or validation criterion for the ATSSS rule.

In a further aspect, a method of operating wireless network infrastructure is disclosed. In one embodiment of the method, a network component such as an enhanced 5G PCF, may update a steering mode of a rule or policy associated with descriptive data (e.g., a Traffic Descriptor) such that depending on current location information associated with a user device (which may be mapped to the spectrum band currently in use by the user device). Hence, depending on the user device's current location, the network component may instruct the user device to change the steering mode, and/or modify its implementation of the steering process (e.g., how "aggressively" steering between different accesses should be implemented).

In another aspect of the disclosure, methods and apparatus for utilizing mobile device location information are disclosed. In one embodiment, the methods and apparatus are configured to utilize location information for partitioning one or more sets of UE within the same location area, such as to use respective different 3GPP band classes. In one variant, the partitioning is used to achieve load balancing across different 3GPP bands within that same area.

In another aspect, a method for utilization of prioritized frequency spectrum in a wireless network is disclosed. In one embodiment, the method includes: receiving one or more rules from a network; evaluating the one or more rules to identify the components of the rule matching or applicable to a prescribed data unit based on a selection criterion; based at least on the evaluation, associating the data unit to the matching rule; and routing the traffic on the data unit based on a prioritized list of frequency bands.

In another embodiment, the method includes using a user device to evaluate a set of rules components to identify the components of the rule for matching to the data unit; and using the identified matching component(s) to prioritize the frequency spectrum.

In yet another embodiment the method includes using a location tracker to track the UE location; using a location information to frequency mapper to map the reported location information to frequency bands; utilizing the mapped frequency bands to update the selection criterion for the set of the rules.

In additional aspect of the disclosure, computer readable apparatus is described. In one embodiment, the apparatus includes a storage medium configured to store one or more computer programs, and includes a program memory or HDD or SSD on a computerized device such as a 5GS gNB.

In a further aspect, a wireless network entity is disclosed. In one embodiment, the entity comprises a computer program operative to execute on a digital processor apparatus, and configured to, when executed, obtain user device data from a control or network entity with which the node is in communication, and based at least on the data, cause selective implementation of policy or rule updates for at least the user device.

In one implementation, the node comprises a 3GPP-compliant enhanced PCF (PCFe).

In a further aspect of disclosure, an enhanced 3GPP-compliant UE (UEe) is disclosed. In one embodiment, the UEe includes a receiver module, a transmitter module, a route or access selection module.

In one variant, the UE may further include a processor apparatus; a wireless modem chipset in data communication with processor apparatus; a program memory in data communication with processor apparatus; a mass storage; and an RF front end module. In further implementation, the program memory includes at least one program which is configured to, when executed to the processor apparatus, cause the UE to implement a route selection policy based on an access selection criterion to utilize a prioritized frequency band.

In another embodiment, the UEe includes computerized logic configured to utilize one or more fields of an IE to determine band class priority. In one variant, the IE is a route selection IE associated with a 3GPP USRP function. In another variant, the IE is an ATSSS rule selection IE.

In a further embodiment, the UEe includes computerized logic configured to utilize one or more UEe location fields of an IE to determine traffic steering behavior for the UE. In another aspect of the disclosure, methods and apparatus for aggregating or partitioning user devices within a wireless network are disclosed. In one embodiment, the user devices include 3GPP 5GS compliant UEe, and location information of each UE is used for partitioning a plurality or set of UE within the same location or area to use different 3GPP band classes, such as to achieve load balancing across different 3GPP bands within that same area, or achieve yet other goals or optimizations such as enhanced user experience for certain tiers of subscribers or users.

In a further aspect of the disclosure, a method of operating a wireless user device within a wireless network is disclosed. In one embodiment, the wireless network has a controller process and at least one wireless access node, and the method includes: receiving at the user device via the wireless access node, policy data generated by the controller process; and utilizing at least portions of the policy data to cause selective utilization by the wireless user device of at least one of a plurality of options for one or more prescribed functions.

In one variant, the selective utilization comprises utilization of a prioritized list of a plurality of frequency bands based on at least one of (i) a selection policy or (ii) location information relating to the wireless user device.

In another variant, the utilizing at least portions of the policy data to cause selective utilization by the wireless user device of at least one of a plurality of options for one or more prescribed functions comprises selective utilization of one of a plurality of frequency bands contained within a listing within the policy data for subsequent frequency band selection or reselection; and the utilizing at least portions of the policy data comprising determining whether an access type specified for use by the wireless user device comprises one of a prescribed set of values.

In one implementation thereof, the wireless network comprises a 3GPP compliant 5G (Fifth Generation) network or 5GS; the wireless user device comprises a 5GS enabled UE (user equipment); the policy data comprises a URSP (UE Route Selection Policy) rule; and the determining whether an access type specified for use by the wireless user device comprises one of a prescribed set of values comprises determining whether an access type variable associated with the URSP rule comprises a value of either (i) 3GPP Access, or (ii) Multi-Access.

In one configuration of the foregoing, the subsequent selection or re-selection is performed pursuant to either: (i) a change in tracking area (TA) or cell by the UE, or (ii) a delivery of application data associated with a specific delivery rule or requirement.

In another aspect of the disclosure, a computerized network apparatus for use in a wireless infrastructure is described. In one embodiment, the computerized network apparatus includes: digital processing apparatus; at least one data network interface in data communication with the digital processing apparatus; and a storage device in data communication with the digital processing apparatus, the storage device comprising a storage medium having at least one computer program.

In one variant, the at least one computer program is configured to, when executed on the digital processing apparatus, cause the computerized network apparatus to: receive location information relating to a location of a user device; determine one or more frequency bands associated with the location; identify a steering rule associated with a data traffic class utilized by the user device; based at least on the determined one or more frequency bands, determine if an update or modification to the traffic steering rule is required; and cause issuance of an updated or modified steering rule based to the user device via the wireless network.

In one variant, the updated or modified steering rule comprises a 3GPP ATSSS rule, and comprises data configured to cause the user device to change at least one of steering mode or steering functionality for the data traffic. In one implementation, thereof, the at least one of steering mode or steering functionality comprises a degree of sensitivity to steerage of the data traffic between a 3GPP access and a non-3GPP access.

In another variant, the determination if an update or modification to the traffic steering rule is required comprises an algorithmic analysis of whether use of another steering mode or steering functionality would enhance at least one aspect of performance associated with transmission or receipt of the data traffic.

In a further aspect of the disclosure, a computerized wireless user apparatus for use within a wireless network is described. In one embodiment, the apparatus includes: digital processing apparatus; at least one wireless network interface in data communication with the digital processing apparatus; and a storage device in data communication with the digital processing apparatus, the storage device comprising a storage medium having at least one computer program.

In one variant, the at least one computer program is configured to, when executed on the digital processing apparatus, cause the computerized wireless user apparatus to: evaluate a first portion of policy rule data to determine whether a first criterion is met for a first type of data traffic; and if the first criterion is met, causing utilization of a second portion of the policy rule data, the utilization of the second portion of the policy rule data causing the wireless user apparatus to perform a subsequent selection of one or more wireless frequency bands according to at least one of a prescribed hierarchy or priority list.

In another variant, the policy rule data is generated by a network computerized process and transmitted to the wireless user apparatus via the wireless network.

In a further variant, the policy rule data comprises a 3GPP URSP (UE Route Selection Policy) Rule comprising a plurality of information elements (IEs), the plurality of IEs comprising the first portion and the second portion. In one implementation, the first portion comprises an Access Type IE, and the second portion comprises a frequency band IE. In one configuration thereof, the first type of data traffic is specified by data of another IE of the URSP rule, and the frequency band IE is applicable to only that first type of data traffic.

In yet another variant of the user apparatus, the at least one hierarchy or priority list comprises a plurality of frequency band data arranged in a prescribed order such that the wireless user device will utilize the plurality of frequency band data to cause the subsequent selection sequentially according to the prescribed order. In one implementation thereof, the subsequent selection is pursuant to at least one of (i) a change in the area within which the wireless user apparatus is then-currently operating, or (ii) the first type of data traffic requiring a specific delivery rule or requirement.

In another aspect of disclosure, computer readable apparatus is described. In one embodiment, the apparatus includes a storage medium configured to store one or more computer program. In embodiment, the apparatus includes a program memory or HDD or SSD on a computerized network controller device, such as MSO controller. In another embodiment, the apparatus includes a program memory, HDD or SSD on a computerized wireless network or device (e.g., PCF, gNB or UE).

These and other aspects shall become apparent when considered in light of the disclosure provided herein.

BRIEF DESCRIPTION OF THE DRAWINGS

FIGS. 2A-2C illustrate tabular representations of prior art 3GPP URSP route selection policies.

FIG. 3 is a tabular representation of a prior art 3GPP ATSSS rule framework.

FIG. 5 is logical flow diagram illustrating one embodiment of a generalized method of utilizing spectrum prioritization data within a wireless network.

FIG. 5A is a logical flow diagram illustrating one exemplary implementation of the method of FIG. 5, wherein an enhanced 3GPP USRP framework is used as the basis of the spectrum prioritization.

FIG. 6 is a tabular representation of an embodiment for an enhanced 3GPP UE route selection descriptor data structure according to the present disclosure.

FIG. 9 is a logical flow diagram illustrating one embodiment of a generalized method for a user device performing enhanced traffic steering according to the present disclosure.

FIG. 10 is a tabular representation of one embodiment for enhanced 3GPP ATSSS rule with band class and/or UE location IE according to the present disclosure.

FIG. 12 is a logical flow diagram illustrating one embodiment of a generalized method for updating route selection logic according to the present disclosure.

FIG. 13 is a logical flow diagram illustrating one embodiment of a generalized method for utilizing band selection logic to partition or categorize user devices within a target area, according to the present disclosure.

Figure 1:
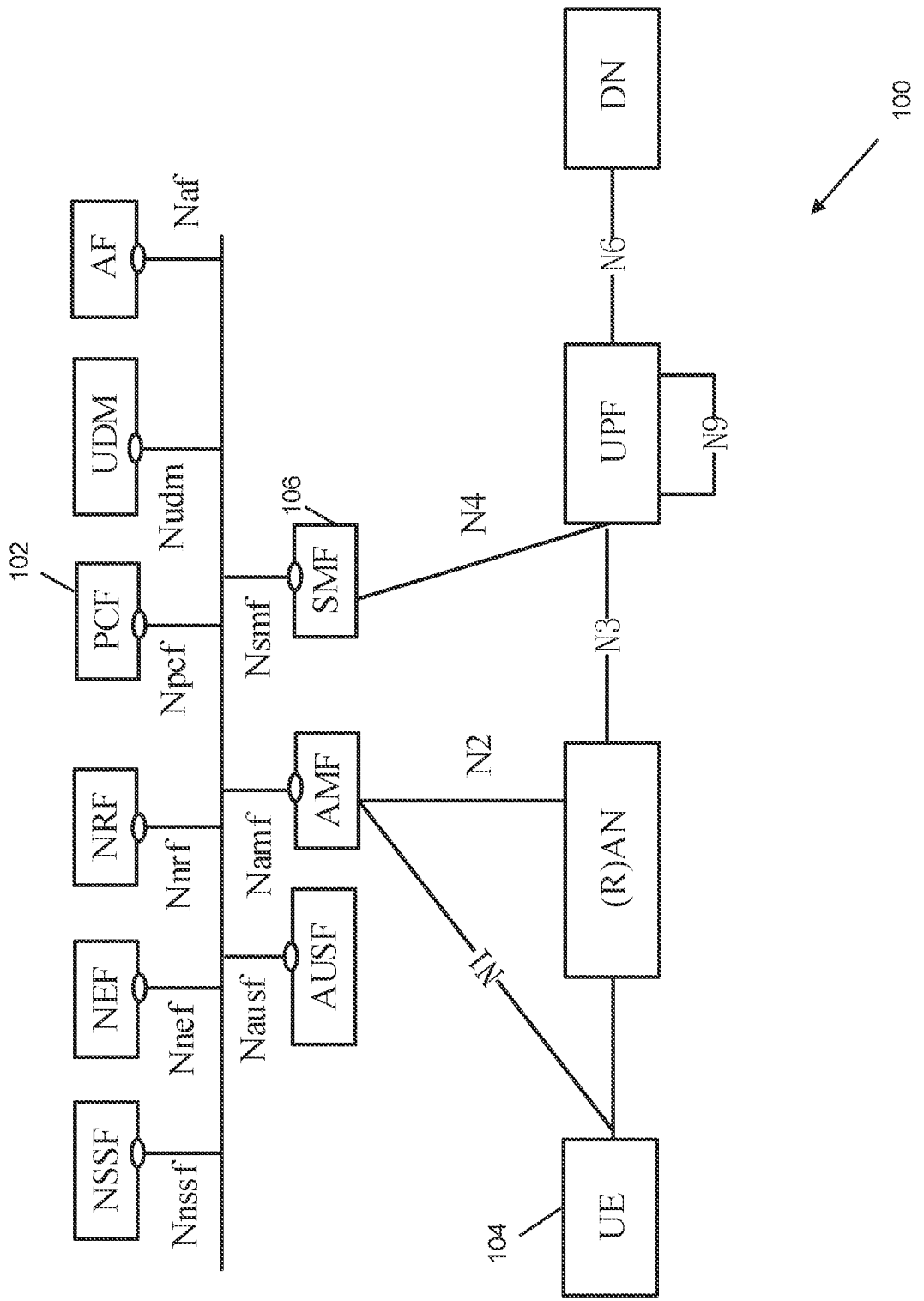
FIG. 1 is a functional block diagram of a prior art 5G architecture and the various components thereof.
Figure 3A:
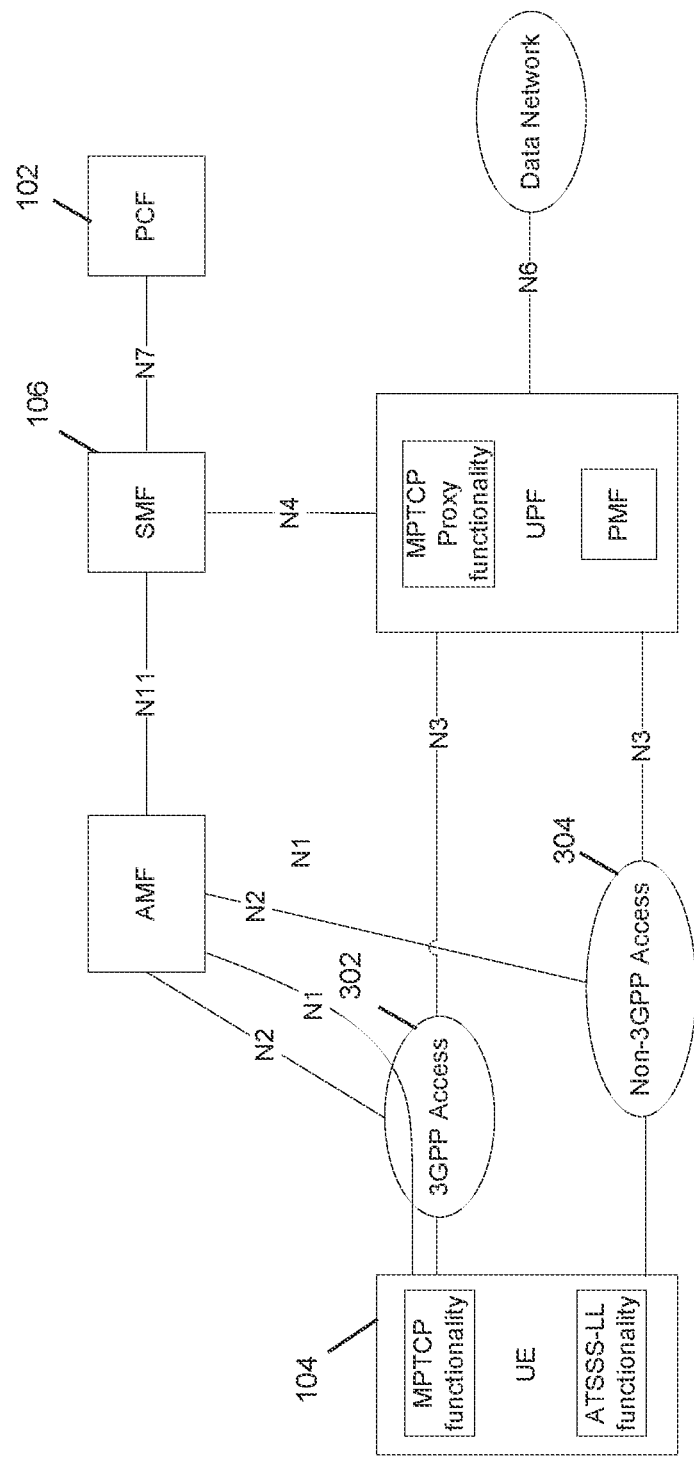
FIG. 3A is a functional block diagram of a prior art 3GPP architecture for ATSSS support.
Figure 4:
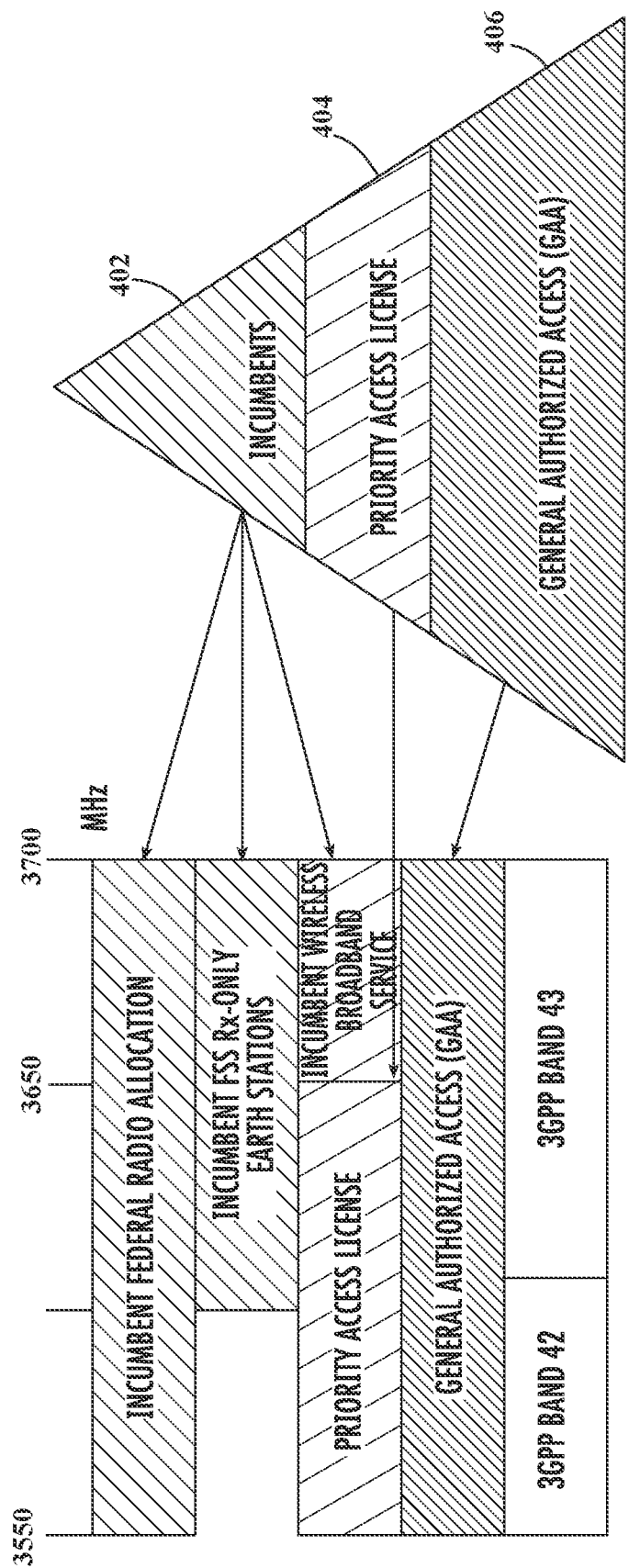
FIG. 4 is a graphical illustration of prior art CBRS (Citizens Broadband Radio Service) users and their relationship to allocated frequency spectrum in the 3.550 to 3.700 GHz band.
Figure 4A:
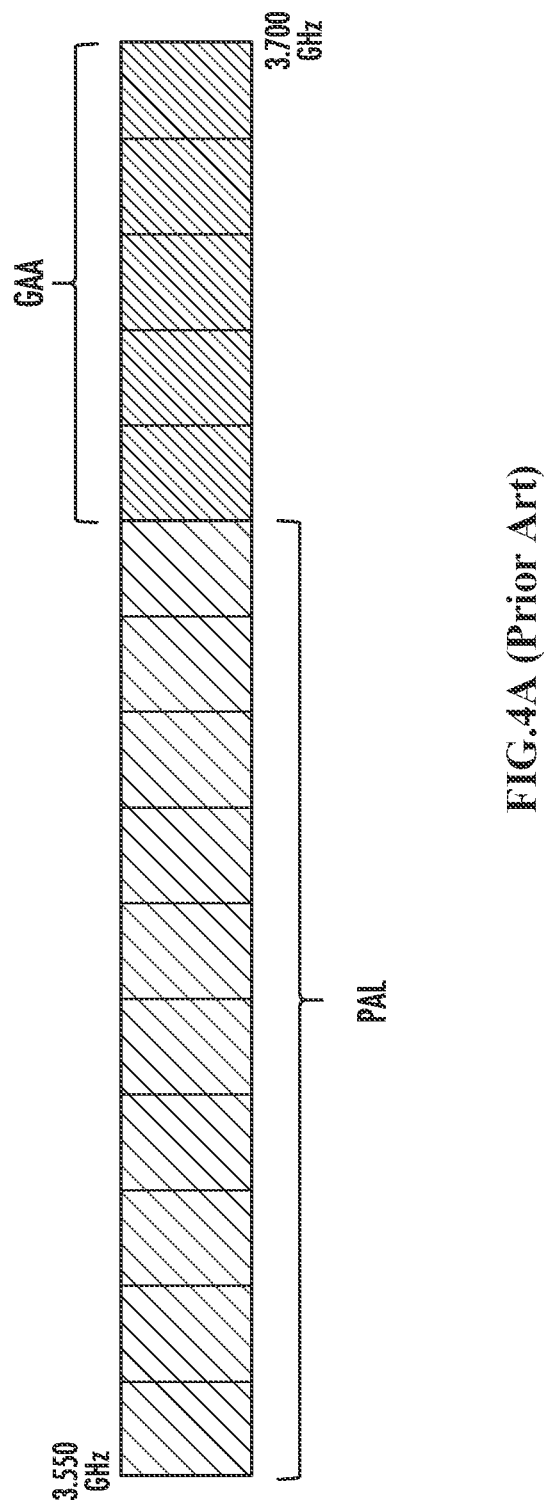
FIG. 4A is a graphical representation of allocations for PAL versus GAA users within the frequency band of FIG. 4.

All figures © Copyright 2020 Charter Communications Operating, LLC. All rights reserved.

DETAILED DESCRIPTION

Reference is now made to the drawings wherein like numerals refer to like parts throughout.

As used herein, the term "access node" refers generally and without limitation to a network node which enables communication between a user or client device and another entity within a network, such as for example a CBRS CBSD, or a cellular xNB.

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the term "CBRS" refers without limitation to the CBRS architecture and protocols described in *Signaling Protocols and Procedures for Citizens Broadband Radio Service (CBRS): Spectrum Access System (SAS)—Citizens Broadband Radio Service Device (CBSD) Interface Technical Specification*—Document WINNF-TS-0016, Version V1.2.1.3, January 2018, incorporated herein by reference in its entirety, and any related documents or subsequent versions thereof.

As used herein, the terms "client device" or "user device" or "UE" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, and vehicle infotainment systems or portions thereof.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "headend" or "backend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, over-the-top services, streaming services, and the Internet.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), and 4G/4.5G LTE.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), 3D memory, and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A/LTE-U/LTE-LAA, 5G NR, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB 2.0, 3.0. OTG), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), LTE/LTE-A/LTE-U/LTE-LAA, Wi-Fi (802.11), WiMAX (802.16), Z-wave, PAN (e.g., 802.15), or power line carrier (PLC) families. As used herein the terms "5G" and "New Radio (NR)" refer without limitation to apparatus, methods or systems compliant with 3GPP Release 15, and any modifications, subsequent Releases, or amendments or supplements thereto which are directed to New Radio technology, whether licensed or unlicensed.

As used herein, the term "quasi-licensed" refers without limitation to spectrum which is at least temporarily granted, shared, or allocated for use on a dynamic or variable basis, whether such spectrum is unlicensed, shared, licensed, or otherwise. Examples of quasi-licensed spectrum include without limitation CBRS, DSA, GOGEU TVWS (TV White Space), and LSA (Licensed Shared Access) spectrum.

As used herein, the term "SAE (Spectrum Allocation Entity)" refers without limitation to one or more entities or processes which are tasked with or function to allocate quasi-licensed spectrum to users. Examples of SAEs include SAS (CBRS). PMSE management entities, and LSA Controllers or Repositories.

As used herein, the term "SAS (Spectrum Access System)" refers without limitation to one or more SAS entities which may be compliant with FCC Part 96 rules and certified for such purpose, including (i) Federal SAS (FSAS), (ii) Commercial SAS (e.g., those operated by private companies or entities), and (iii) other forms of SAS.

As used herein, the term "server" refers to any computerized component, system or entity regardless of form which is adapted to provide data, files, applications, content, or other services to one or more other devices or entities on a computer network.

As used herein, the term "shared access" refers without limitation to (i) coordinated, licensed sharing such as e.g., traditional fixed link coordination in 70/80/90 GHz and the U.S. FCC's current rulemaking on potential database-coordinated sharing by fixed point-to-multipoint deployments in the C-band (3.7-4.2 GHz); (ii) opportunistic, unlicensed use of unused spectrum by frequency and location such as TV White Space and the U.S. FCC's proposal to authorize unlicensed sharing in the uplink C-band and other bands between 5925 and 7125 MHz; (iii) two-tier Licensed Shared Access (LSA) based on geographic areas and database assist such as e.g., within 3GPP LTE band 40 based on multi-year sharing contracts with tier-one incumbents; and (iv) three-tier shared access (including quasi-licensed uses) such as CBRS.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "users" may include without limitation end users (e.g., individuals, whether subscribers of the MSO network, the MNO network, or other), the receiving and distribution equipment or infrastructure such as a CPE/FWA or CBSD, venue operators, third party service providers, or even entities within the MSO itself (e.g., a particular department, system or processing entity).

Overview

In one exemplary aspect, the present disclosure provides improved methods and apparatus for providing wireless services which, inter alia, provide enhancements over extant functionality regarding utilization of spectrum for users of a wireless network. For instance, in one exemplary implementation, the disclosed method and apparatus utilize prioritized 3GPP Band Class information in enhanced UE Route Selection Policy (URSPe) or Access Traffic Steering, Switching, and Splitting (ATSSSe) rules.

In one embodiment, an enhanced route selection (e.g. 3GPP URSP) rule framework which includes prioritized 3GPP band class information is used in certain cases (e.g., where an access preference or type for the URSPe rule is selected). Updates to URSPe rules or policy may be delivered to an enhanced UE (UEe) by the network at any time based on, for example, the specific UEe's identity, network parameters, and/or the UEe's current registered area (e.g., UEe location) and the core network serving area.

In another variant, a band prioritization-based re-selection protocol is implemented based on the information given by the core-network. In one implementation, UEe first evaluates the USRPe rule from the core-network prior to taking RAN information for the target radio access node selection in situations where it is required to: (i) establish or update a PDU session for associated traffic (e.g., application data); (ii) move to a new tracking area (TA) due to e.g., mobility considerations or requirements; or (iii) deliver any application data associated with a specific rule.

In another embodiment, an enhanced traffic steering (e.g., 3GPP ATSSSe) rule framework is used which allows use of secondary information as at last part of a validation criteria for an enhanced ATSSS rule. In one variant, the ATSSSe rule is used to include data relating to 3GPP Band Class(es) or UE location as the secondary information for validation or the ATSSSe rule. In one implementation, depending on the UEe's current location (which may be mapped or correlated to the spectrum band currently in use by the UEe), an enhanced network PCF (PCFe) may update the Steering Mode of a ATSSS—rule associated with a Traffic Descriptor. Depending on e.g., the UE's current location (and other factors), the PCFe may instruct UEe to change the steering mode, and/or how aggressively to implement steering functionality, such as between 3GPP and non-3GPP accesses available to it.

Additionally, methods and apparatus for aggregating or partitioning user devices within a wireless network are disclosed. In one embodiment, the user devices include 3GPP 5GS compliant UEe, and location information of each UEe is used for partitioning a plurality or set of UEe's within the same location or area to use different 3GPP band classes. This approach may be used to achieve various operational or other goals, such as to achieve load balancing across different 3GPP bands within that same area, or enhanced user experience for certain tiers of subscribers or users.

Notably, the foregoing methods and apparatus may be integrated into various types of wireless network architectures, such as e.g., (i) Mobile Network Operator (MNO) networks utilizing 3GPP protocols and licensed spectrum; (ii) Multiple Systems Operator (MSO) networks utilizing 3GPP protocols and unlicensed or quasi-licensed spectrum; and/or (iii) various combinations or hybrids of the foregoing, including those where an MNO and MSO cooperate to share infrastructure.

Moreover, network operators (regardless of type) are enabled by the methods and apparatus disclosed herein to utilize scarce (and sometimes costly) frequency spectrum resources, whether licensed, quasi-licensed, or unlicensed, so as to align better with their operational and business case needs through use of enhanced route selection, re-selection, and traffic steering policies on a device-specific basis.

Detailed Description of Exemplary Embodiments

Exemplary embodiments of the apparatus and methods of the present disclosure are now described in detail. While these exemplary embodiments are described in the context of the previously mentioned wireless access nodes (e.g., gNBs) associated with or supported at least in part by a managed network of a service provider (e.g., MSO and/or MNO networks), other types of radio access technologies ("RATs"), other types of networks and architectures that are configured to deliver digital data (e.g., text, images, games, software applications, video and/or audio) may be used consistent with the present disclosure. Such other networks or architectures may be broadband, narrowband, or otherwise, the following therefore being merely exemplary in nature.

It will also be appreciated that while described generally in the context of a network providing service to a customer or consumer or end user or subscriber (i.e., within a prescribed service area, venue, or other type of premises), the present disclosure may be readily adapted to other types of environments including, e.g., outdoors, commercial/retail, or enterprise domain (e.g., businesses), or even governmental uses. Yet other applications are possible.

Also, while certain aspects such as certain types of PDU sessions are described primarily in the context of the well-known Internet Protocol (described in, inter alia, Internet Protocol DARPA Internet Program Protocol Specification, IETF RCF 791 (September 1981) and Deering et al., Internet Protocol, Version 6 (IPv6) Specification, IETF RFC 2460 (December 1998), each of which is incorporated herein by reference in its entirety), it will be appreciated that the present disclosure may utilize other types of protocols (and in fact bearer networks to include other internets and intranets) to implement the described functionality.

Moreover, while the various aspects of the present disclosure contemplate use of quasi-licensed spectrum (such as CBRS spectrum in the 3.5 GHz band (specifically 3,550 to 3,700 MHz) in place or in addition to licensed or unlicensed spectrum, it will be appreciated by those of ordinary skill when provided the present disclosure that the methods and apparatus described herein may be configured to utilize other "quasi-licensed" or shared access systems or other spectrum, including without limitation DSA, LSA, or TVWS systems, and those above 4.0 GHz (e.g., currently proposed allocations up to 4.2 GHz, and even millimeter wave bands such as those between 24 and 100 GHz).

Further, while some aspects of the present disclosure are described in detail with respect to so-called 5G "New Radio" (3GPP Release 15 and TS 38.XXX Series Standards and beyond), such aspects are in some cases access technology "agnostic" and hence may be used across different access technologies, and can be applied to, inter alia, any type of P2MP (point-to-multipoint) or MP2P (multipoint-to-point) technology, including e.g., Qualcomm Multefire.

Other features and advantages of the present disclosure will immediately be recognized by persons of ordinary skill in the art with reference to the attached drawings and detailed description of exemplary embodiments as given below.

Methods

1. Enhanced Band/Spectrum Selection and URSP (URSPe)—

Referring now to FIGS. 5-6, one embodiment of a generalized method of utilizing enhanced policy or rules (including with prioritized band or spectrum information) according to the present disclosure is described in detail.

As shown, the method 500 includes first receiving at a user device (e.g., mobile wireless device) rules data from a network process or entity per step 503. Next, per step 505, the user device evaluates the rules data in terms of traffic description data also obtained from the network or another source. For instance, a certain type of traffic may have certain rules or policies associated with it, and the user device 505 in step 505 may use the obtained rules and description data to determine or create a correlation between the traffic so described and one or more rules or policies to be applied thereto. One such evaluation may be for determining whether certain traffic types should be subjected to prioritization, including for e.g., band class or spectrum usage within the network (or at least the portion thereof within which the user device is operating) under certain operating scenarios where the user device must select a frequency band and/or spectrum type.

Per step 507, if one or more prioritization criteria are met (based on the evaluation of step 505), then the method 500 proceeds to step 509, wherein prioritization data present within the received rule(s) data is implemented. For instance, in the illustrated embodiment, prioritized re-selection logic (normally governed by other existing data/mechanisms of the underlying wireless network protocol) is used when the user device for instance changes its mobility state or location.

Alternatively, if at step 507 the prioritization criteria are not met, then the existing mechanisms previously referenced are used for the basis of the function of interest (e.g., band/spectrum selection or re-selection) per step 511.

It will be appreciated that the foregoing use of prioritization based on traffic description, and frequency band/spectrum type selection or re-selection, are but a few of the possible functions useful with the general methodology 500 of FIG. 5. For instance, something other than traffic type/description could be used as a basis of evaluation against the rules data criteria, and/or functions other than band or spectrum type could be controlled.

Referring now to FIGS. 5A and 6, one implementation of the generalized method 500 of FIG. 5 is shown and described. This methodology is described in the context of the extant 3GPP URSP procedure, although it will be appreciated that it may be adapted to other procedures and applications (including non-3GPP uses) by those of ordinary skill given the present disclosure.

Specifically, the illustrated implementation of the methodology 520 of FIG. 5A allows the enhanced user device (UEe) to use prioritized 3GPP Band Class(es) where one or more prioritization criteria are met; here, if the Access Type Preference parameter (see FIG. 6) of the URSP rule is set as "3GPP" or "Multi-Access." The use of prioritized 3GPP Band Class(es) in this implementation enables better and more efficient utilization of available (ostensibly limited) spectrum since current 3GPP standards provide no such mechanism, as described previously.

At step 521 of the methodology 520, the UEe received application data (e.g., user plane or UP data) which may be associated with one or more Traffic Descriptors (TDs) in URSP rules.

Per step 523, the UEe next accesses URSP rules (such as for example those received from the PCF of the Home Public Land Mobile Network (HPLMN) and stored in the UEe). As noted subsequently herein, these received rules have been enhanced with additional data relating to 3GPP band class(es) in one embodiment, and hence are referenced hereinafter as "URSPe" rules. Additionally, the UEe maybe also pre-configured with URSPe rules data, such as that stored in its memory or other local device (see FIG. 20). It is noted in passing that a non-enhanced UE (i.e., one without URSPe logic) may still receive the URSPe rules data, but simply will not be able to extract or recognize the enhancement (e.g., band class data or other).

At step 525, the UEe evaluates the URSPe rules data (including Access Type Preference) for the received TD.

Per step 527, if the Access Type is either "3GPP" or "Multi-access", then the UEe obtains additional data useful in determining prioritized band or spectrum allocations per step 529, such as for instance (i) UEe radio capabilities; and/or (ii) USRPe rules associated with existing PDU sessions.

It will be appreciated that the types and quantity of additional data obtained by the UEe (or a proxy node or process operating on behalf thereof) for determining band/spectrum selection may vary as a function of different parameters, including whether prioritized or non-prioritized band class selection/re-selection is invoked. For instance, the additional data obtained for the non-prioritized case might be greater in scope than for the prioritized case, since ostensibly the network (e.g., PCFe, or another process such as an MSO or MNO network optimization process) may have already considered some of the additional data as part of its determination of the band prioritization that is included in the URSPe IE (see FIG. 6). Hence, in some scenarios, use of the URSPe functionality described herein may advantageously obviate collection of additional data by the UEe which would otherwise be required without the availability of such a prioritization scheme.

Moreover, in some cases, the prioritized data might be used as the sole basis of prioritization, such as where additional data is not immediately available, or would induce latency (e.g., where a first "rough cut" of prioritization is implemented based solely on the URSPe Band Class IE, with subsequent refinements based on the IE and other data collected, or where the UEe establishes a "feedback loop" of sorts with the PCFe so as to iteratively refine the prioritization scheme, such as based on actual UEe link performance or other such data available to the PCFe, whether from the UEe or otherwise). At step 531, the prioritized band class data from the URSPe rule and the other data from step 529 are used by the UEe to implement a prioritized band/spectrum function, such as band selection or re-selection pursuant to a mobility condition or other scenario (see FIGS. 8 and 8A).

Conversely, if per step 527 the Access Type does not meet the prescribed criterion, then per step 533 of FIG. 5A the UEe utilizes extant or "non-enhanced" mechanisms for the band/spectrum-related function (e.g., re-selection), such as where the UEe obtains SI (System Information) and RRC Connection Release message data from its serving RAN as a basis for re-selection.

FIG. 6 illustrates an exemplary enhanced 3GPP URSP (URSPe) rule data structure 600, including the Prioritized 3GPP Band Class(es) IE 602 therein used to indicate band prioritization data to the UEe under the prescribed Access Type conditions as previously described. In one implementation, the Prioritized 3GPP Band Class(es) data of the IE 602 is encoded according to a numeric scale (e.g., 0-10), such as in Table 1:

TABLE 1

| Band Designation | Priority |
|---|---|
| Band-A | 7 |
| Band-B | 10 |
| ... | ... |
| Band-F | 2 |

In another implementation, the Prioritized 3GPP Band Class(es) data of the IE 602 is encoded according to a non-numeric (e.g., fuzzy logic or similar) scale, such as in Table 2:

TABLE 2

| Band Designation | Priority |
|---|---|
| Band-A | High |
| Band-B | Low |
| ... | ... |
| Band-F | Medium |

In yet another implementation, the Prioritized 3GPP Band Class(es) data of the IE 602 is encoded according to an ascending or descending order, such as in Table 3:

TABLE 3

| Priority (High-to-Low) |
|---|
| Band-F |
| Band-A |
| ... |
| Band-B |

Various other scaling or rating schemes may be used consistent with the methods and apparatus described herein, as will be appreciated by those of ordinary skill given the disclosure.

Figure 7A:
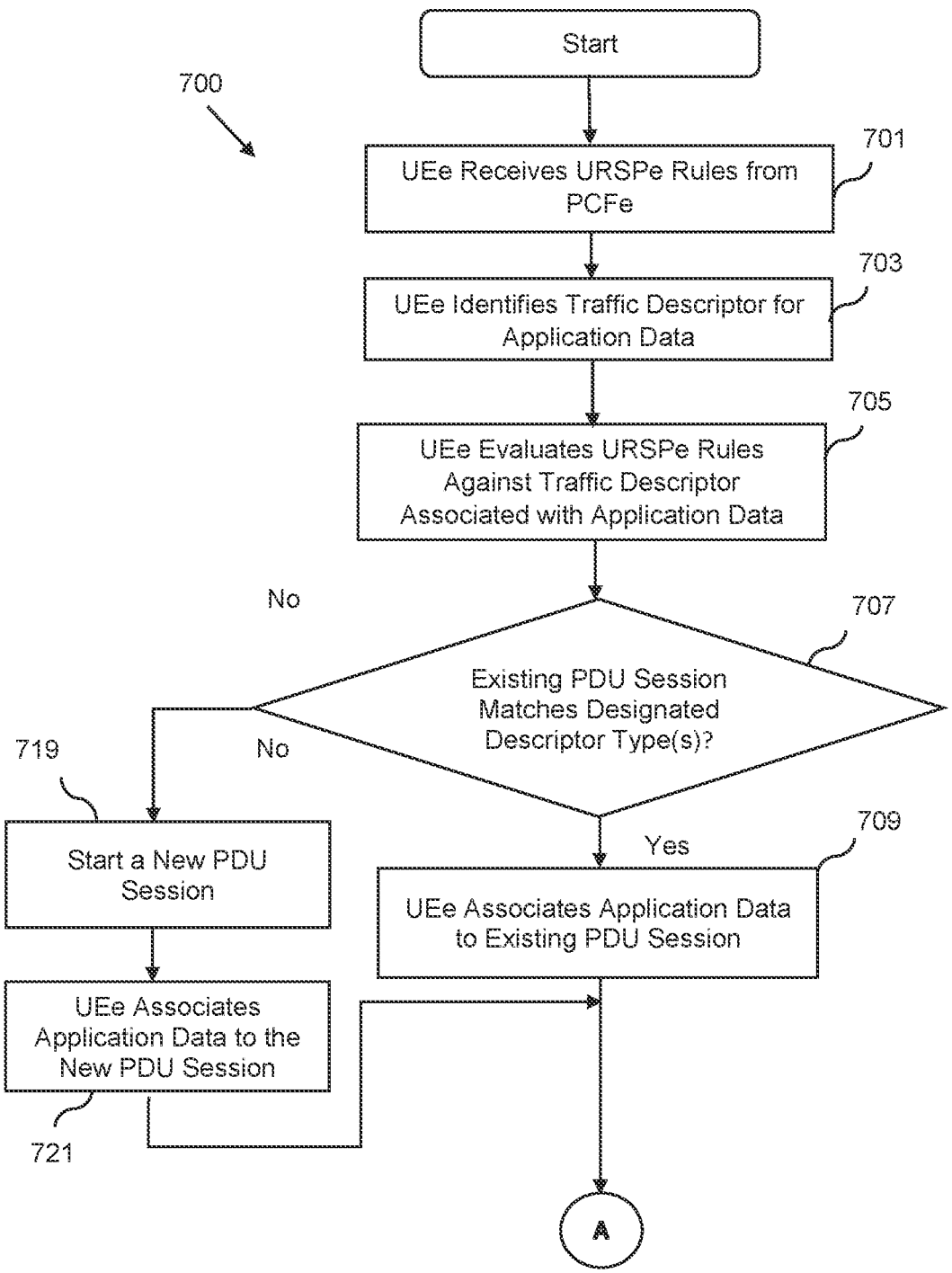
FIGS. 7A and 7B illustrate a logical flow diagram showing one implementation of a method for enhanced URSP operation according to the present disclosure.
Figure 7B:
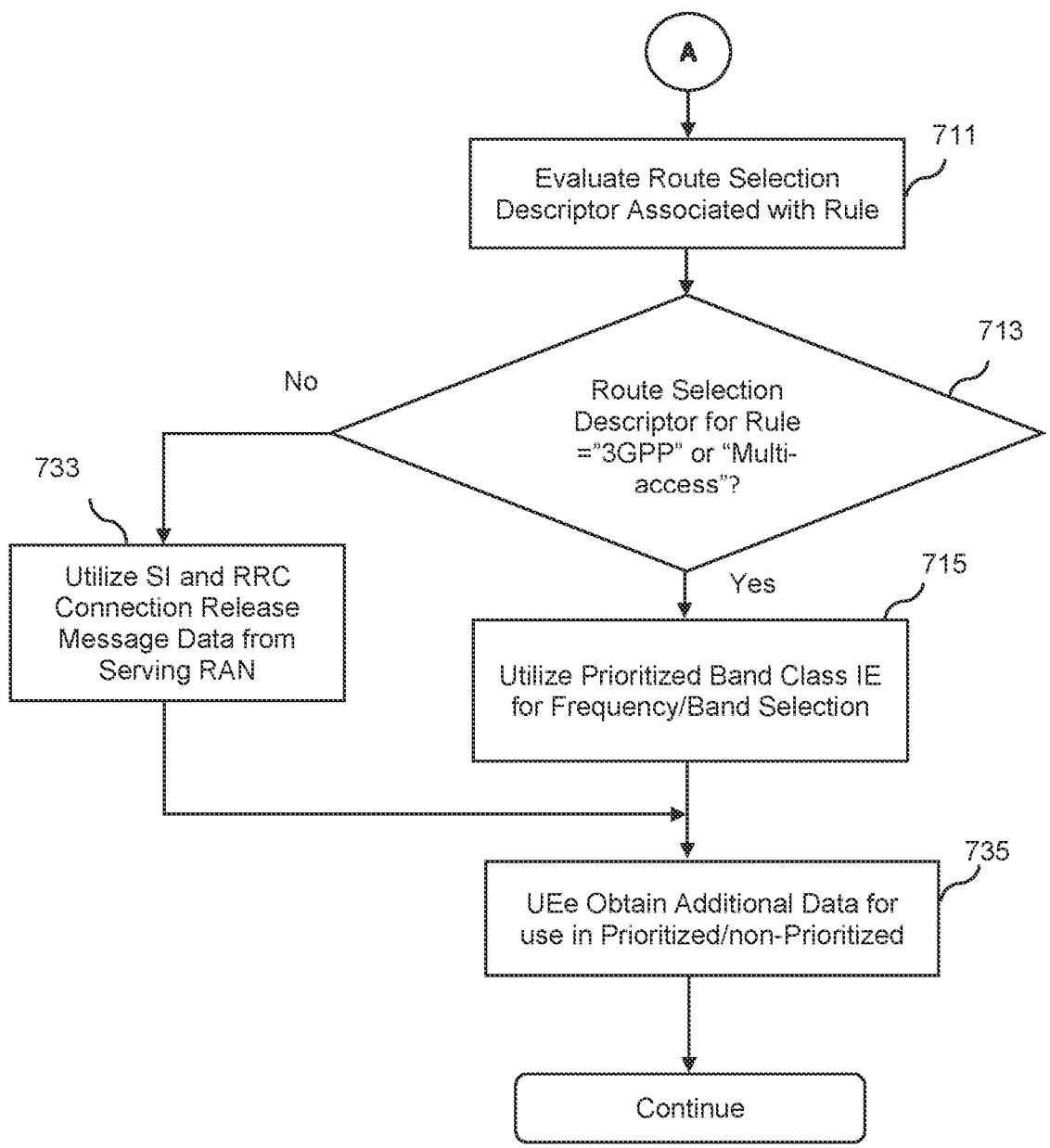

FIGS. 7A and 7B illustrate a logical flow diagram showing another implementation of a method for enhanced URSP operation according to the present disclosure.

Per step 701 of the method 700, the UEe receives the URSPe rules data from the PCFe.

Per step 703, the UEe identifies one or more TDs associated with application data (e.g., UP data).

Per step 705, the UEe evaluates the URSPe rules data against the TD(s) from step 703, and if an existing PDU session matches one or more designated TD types (step 707), then the UEe associates the application data to one or more of the existing PDU sessions per step 709. Alternatively, if no existing PDU sessions match, then a new PDU session is started per step 719, and the UEe associates the application data to the new session per step 721.

Per step 711, the route selection descriptor data (see FIG. 6) of the USRPe rule is evaluated for the application data; if the Route Selection Descriptor of FIG. 6 is "3GPP" or "Multi-access" per step 713, then the UEe uses the Prioritized Band Class IE data for subsequent frequency/band selection purposes per step 715. If not, then the method 700 utilizes existing 3GPP band selection mechanisms per step 733.

Per step 735, the UEe obtains additional data for use in either the non-prioritized or prioritized scenarios, as previously described above (including scenarios-specific data collections scope or policies).

Figure 8:
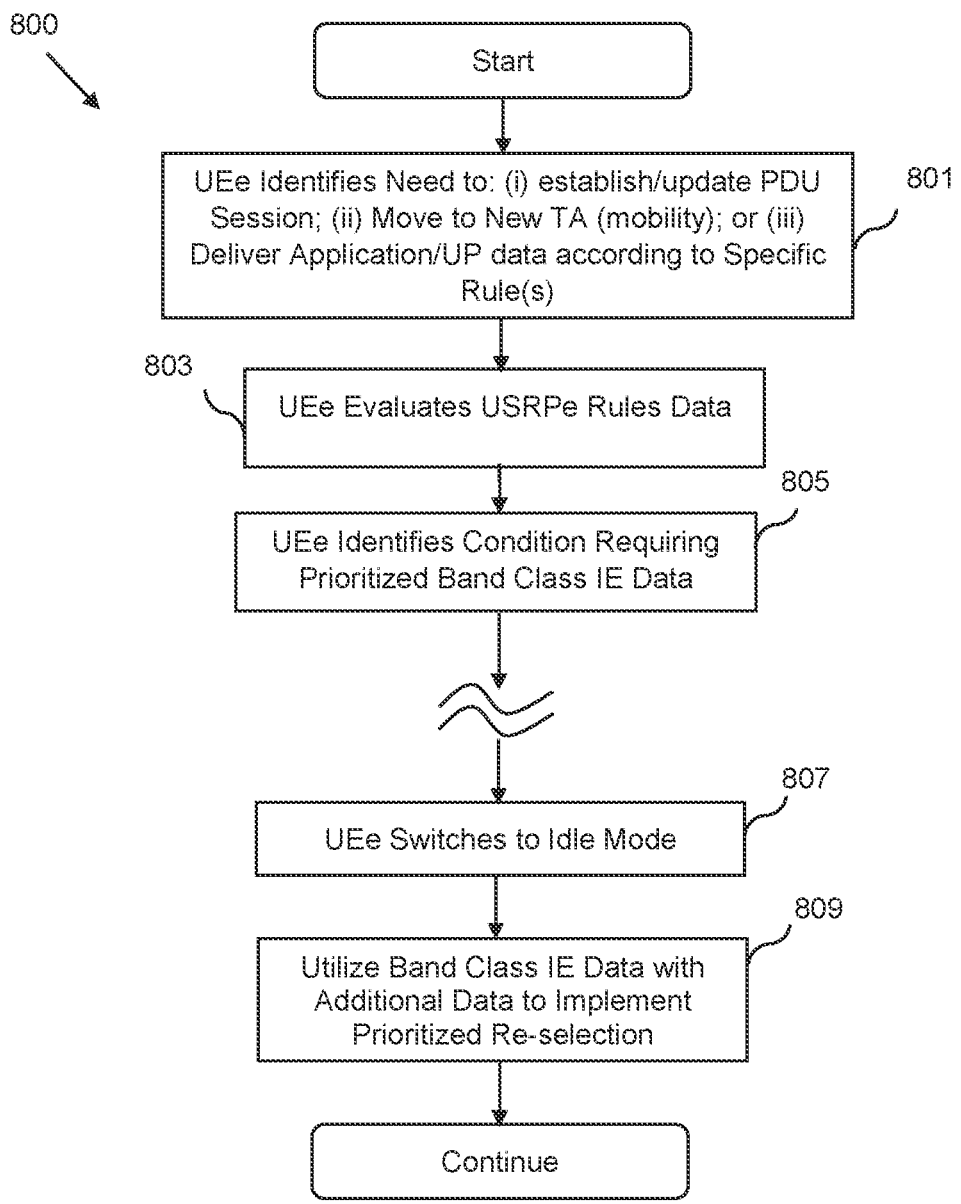
FIG. 8 is a logical flow diagram showing another embodiment of a method for enhanced URSP operation according to the present disclosure.

FIG. 8 is a logical flow diagram showing another embodiment of a method for enhanced URSP operation according to the present disclosure. In this embodiment, the UEe's need (e.g., an aspect of its context which may dictate a need for band selection/re-selection) is first evaluated to determine whether further URSPe logic will be invoked.

For instance, as shown in FIG. 8, per step 801, the UEe identifies one or more scenarios which have been encoded to trigger further prioritization logic; such as where the UEe identifies a need to: (i) establish/update a PDU session; (ii) move to new tracking area (e.g., a mobility scenario); or (iii) deliver application/UP data according to one or more specific rule(s) which would necessitate such selection/re-selection. Other scenarios will also be recognized by those of ordinary skill given the present disclosure.

Per step 803, once further evaluation is triggered, the UEe evaluates URSPe rules data it accesses or receives from e.g., a PCFe (via a gNB), and per step 805, identifies one or more conditions requiring use of the prioritized band class IE data (e.g., if the Access Type specified is 3GPP or Multi-access, and/or other such conditions reflected within the URSPe data).

Per step 807, the UEe enters an idle state or more (whereby band/spectrum selection/re-selection is to be performed according to the prioritization data and any additional data).

Lastly, the UEe uses the IE data 602 along with (optionally) other additional data of the type previously described in order to implement prioritized selection/re-selection of one or more frequency bands and/or spectrum types per step 809 from the idle mode.

Figure 8A:
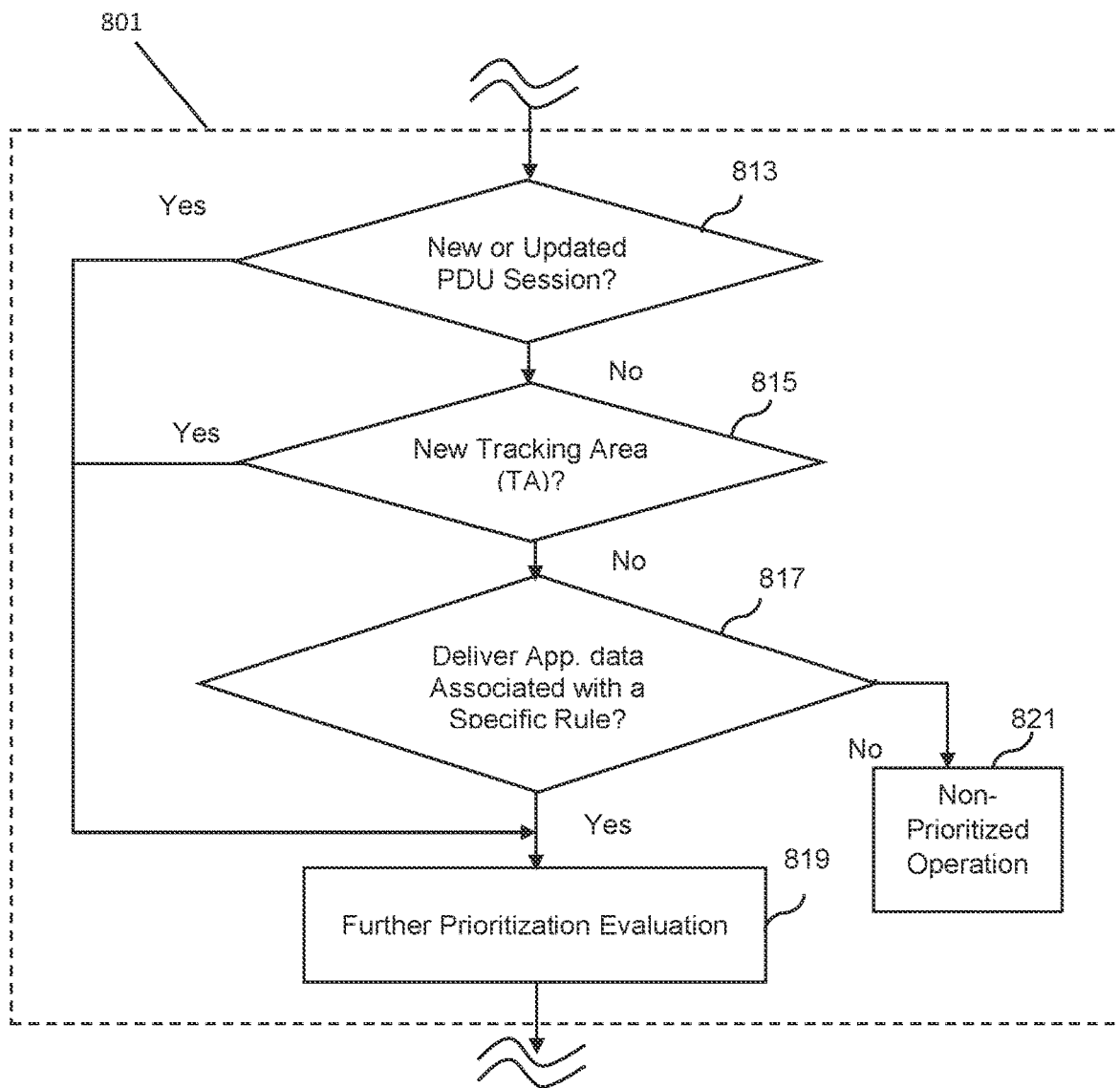
FIG. 8A is a logical flow diagram illustrating one exemplary implementation of a portion of the method of FIG. 8.

FIG. 8A is a logical flow diagram illustrating one exemplary implementation of a portion (step 801) of the method of FIG. 8. As shown, the UEe logic first evaluates whether a new or updated PDU session is required (step 813), and next a new TA (step 817), and depending on the outcome of the logic tree, either conducts further prioritization evaluation (per FIG. 8) or enters non-prioritized state operation, since none of the "trigger" conditions or scenarios has been identified.

2. Enhanced Traffic Steering and ATSSS (ATSSSe)—

Referring now to FIGS. 9-12A, exemplary methods for implementing enhanced traffic routing or steering functionality (including e.g., 3GPP ATSSS functionality) within a wireless network are shown and described.

FIG. 9 is a logical flow diagram illustrating one embodiment of a generalized method 900 for a user device performing enhanced traffic steering according to the present disclosure. Per step 901, the user device establishes a data session with e.g., a distant entity such as a server. This session carries in one embodiment PDUs (protocol data units) relating to an application or process resident on the UE, such as for voice, video, etc.

Per step 903, the user device receives rules data from the network with which it is associated, such as via a base station or access point.

Per step 905, the user device evaluates the rules data for matching traffic descriptions (e.g., which may apply to the PDUs carried via the established session).

Per step 907, the user device evaluates whether the rules data is applicable to its current context, whether based on frequency band in use by the user device, location, traffic type, or other consideration.

Figure 15:
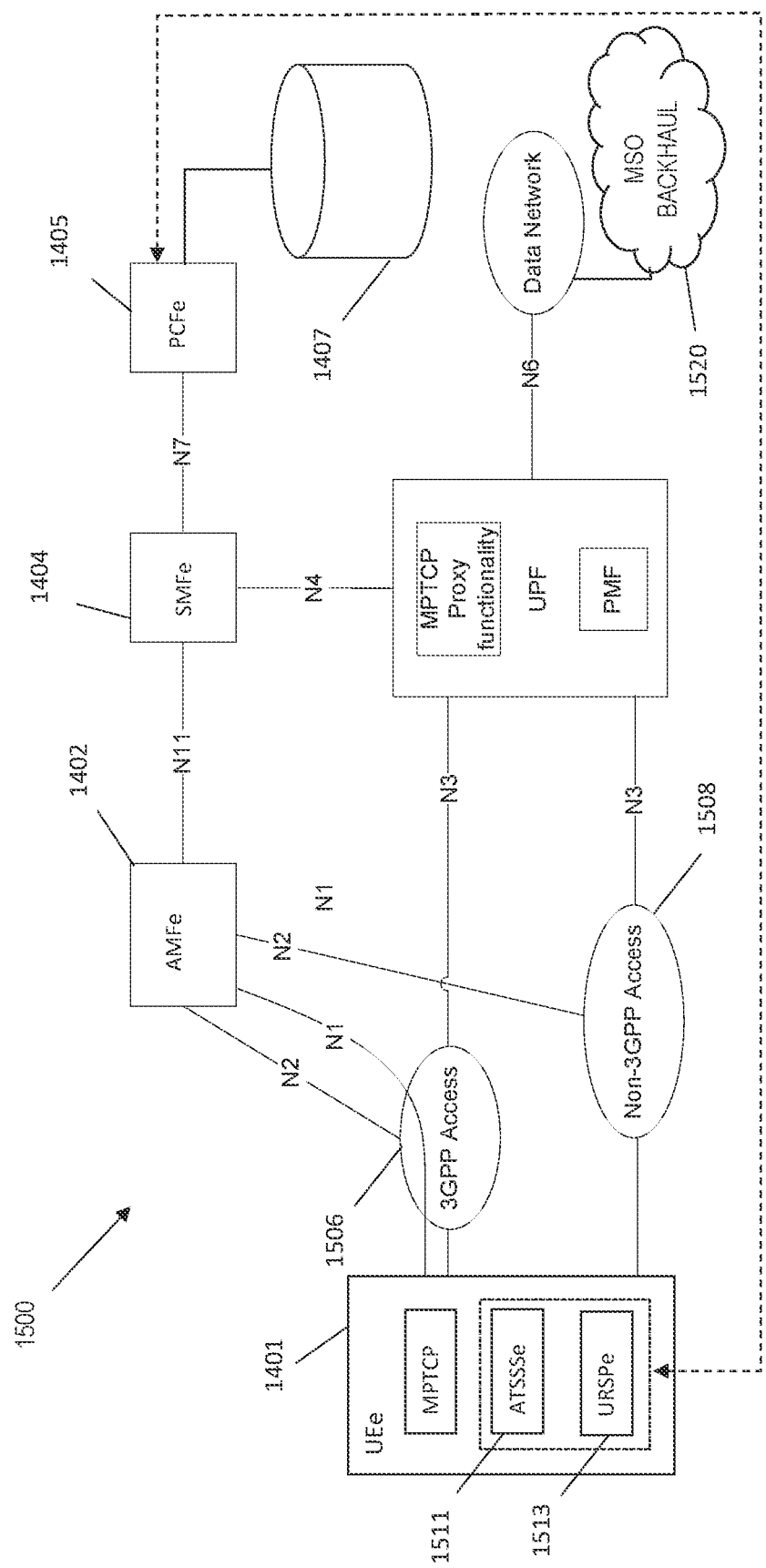
FIG. 15 is a functional block diagram illustrating a first exemplary embodiment of a roaming and non-roaming 3GPP 5GS architecture for enhanced ATSSS (ATSSSe) support according to the present disclosure.
Figure 16:
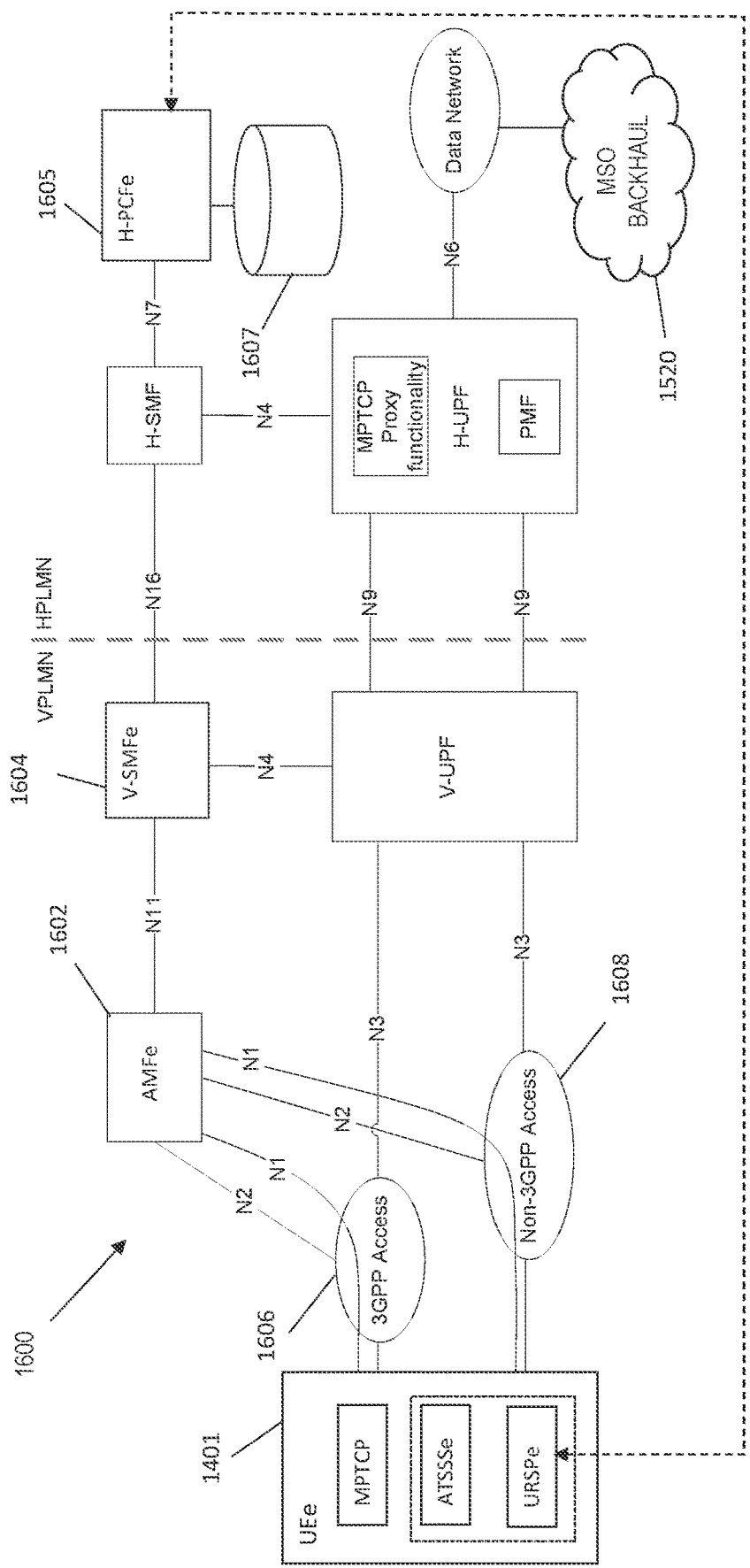
FIG. 16 is a functional block diagram illustrating a second exemplary embodiment of a roaming with home-routed 3GPP 5GS architecture for ATSSSe support according to the present disclosure.
Figure 17:
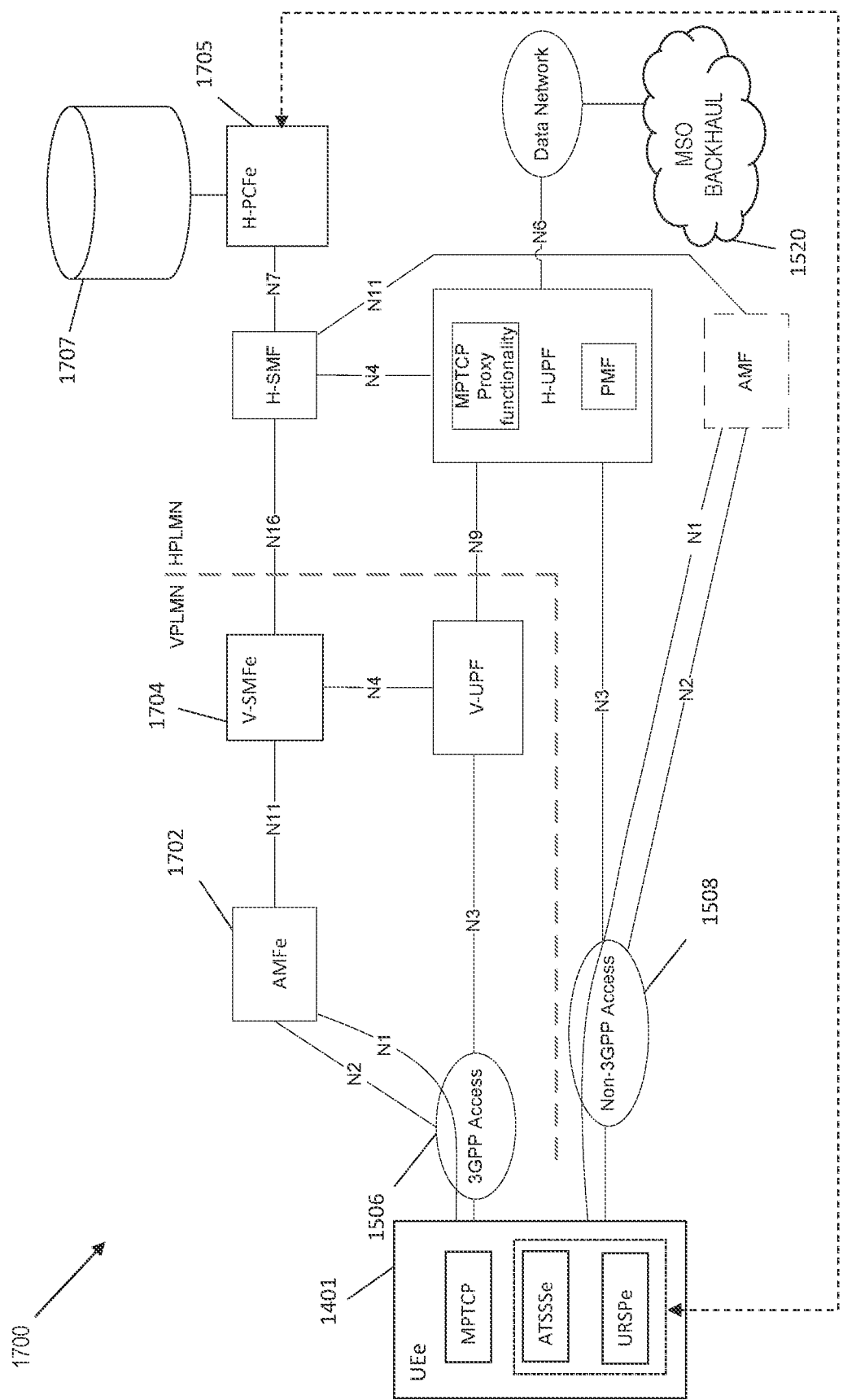
FIG. 17 is a functional block diagram illustrating a third exemplary embodiment of a roaming with home-routed 3GPP 5GS architecture for ATSSSe support according to the present disclosure.

Lastly, per step 909, the user device implements one or more rules (as reflected by the rules data, and/or others within its possession such as stored in its memory) to steer the traffic to which the rule(s) apply, such as by splitting the PDUs of the session(s) across 3GPP and non-3GPP accesses (see FIGS. 15-17 herein).

Figure 9A:
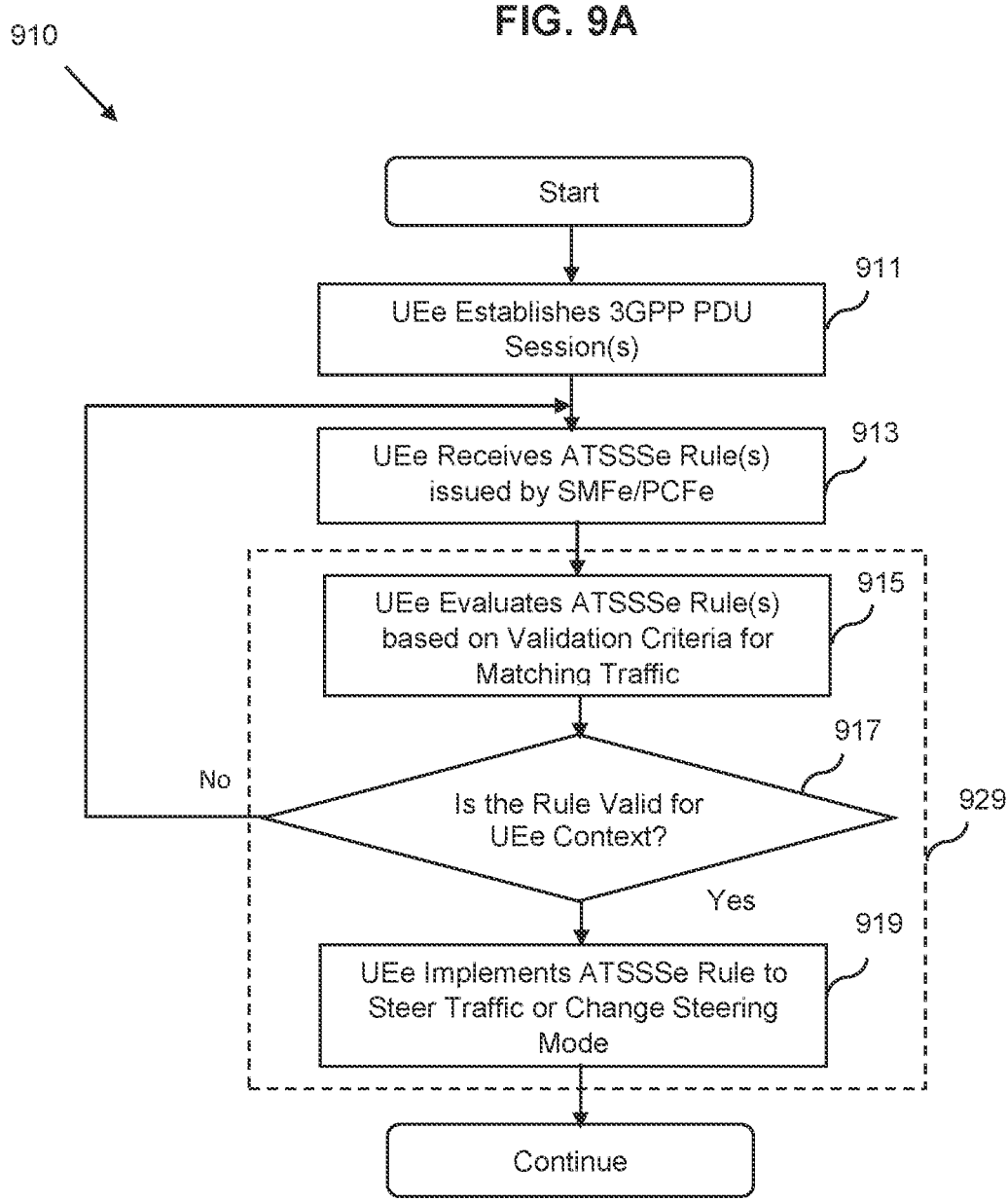
FIG. 9A is a logical flow diagram illustrating one implementation of the generalized method of FIG. 9, wherein a 3GPP UEe implements enhanced ATSSS steering functionality.

FIG. 9A is a logical flow diagram illustrating one implementation of the generalized method of FIG. 9, wherein a 3GPP UEe implements enhanced ATSSS steering functionality.

As shown in FIG. 9A, the method 910 includes establishment of a 3GPP PDU session by the UEe per step 911.

Per step 913, the UEe receives ATSSSe rules data issued by the SMFe based on the policy rules with ATSSS information received from the PCFe (such as via an AMF and a RAN gNB). The ATSSSe rules are received during the PDU session establishment, and the rules can be updated at any time during the lifetime of the PDU session.

Per step 915, the UEe evaluates the ATSSSe rules data based on one or more validation criteria for matching data traffic (e.g. that with a prescribed TD value).

Per step 917, the UEe decides whether the ATSSSe rules data is valid for the current UEe context (e.g., based on its current band in use, location, etc.), and if so, implements the steering functionality or mode (or mode change) dictated by the rule(s) per step 919. If not, the method 910 returns to step 913 and awaits new rules data.

FIG. 10 is a tabular representation of one embodiment for enhanced 3GPP ATSSS rule (ATSSSe) with band class and/or UE location IE according to the present disclosure. As shown, the IE 1000 includes an Access Selection Criteria sub-element 1002 that includes provision for either 3GPP band class data (which may be formatted generally similar to that described previously with respect to FIGS. 5-8A, or differently), or UE location data. In the exemplary embodiment, the IE is constructed such that either UE Location data or 3GPP Band Class data is provided, but not both (see Note X) as an exemplary optimization to reduce complexity, but it will be appreciated that other (non-mutually exclusive) configurations may be utilized consistent with the present disclosure, and moreover, other parameters than 3GPP Band Class or UE Location may be substituted.

As far as the UE Location data IE sub-element, various formats for the data are contemplated. For instance, in one variant, the data is formatted as a listing of one or more Tracking Area Identifiers (TAIs) which indicate respective locations within which the Access Selection (e.g., Steering Mode and/or Steering Functionality IEs 1004).

Moreover, the UE may notify the 3GPP network (e.g., AMF) of its current location by sending a Mobility and Periodic Registration Update message whenever it moves between different TAs.

Figure 20:
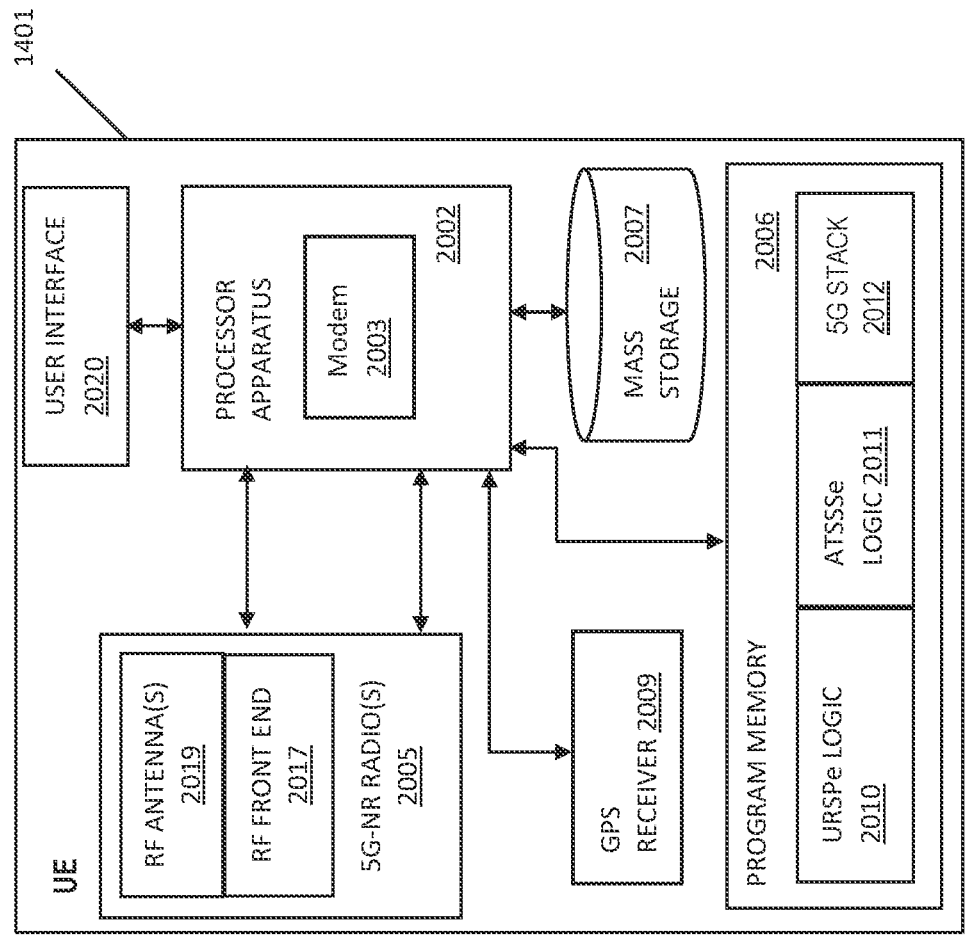
FIG. 20 is a functional block diagram illustrating an exemplary embodiment of an enhanced 3GPP UE (UEe) apparatus useful with various embodiments of the present disclosure.

Additionally, the "listing" above may comprise e.g., ordered or un-ordered recital of the TAIs, etc. as applicable, and other formats of the IE 1002 may be used, including those generally similar to the formats of Tables 1-3 above. For instance, the TAIs,] etc. may be listed in an order of ascending or descending "strictness" (e.g., TAIs 1 through 3 of the list must be strictly adhered to with no exceptions, while TAIs 4-7 are on a "best efforts" or other less stringent basis). Similarly, negative logic may be applied; e.g., such as where only TAIs not on the list allow the ATSSSe steering rule(s) to be applied, whereas those on the list indicate non-applicability. Yet further, it will be appreciated that other indicators or metrics of location may be used in place of TAI related data. For instance, raw location boundary data may be provided as part of the IE, which can be used by the UEe logic to compare with locally derived data (e.g., lat/lon as derived from the UE's GPS receiver as shown in FIG. 20) to determine if the UEe is within a "covered" area where the ATSSSe applies.

It will also be appreciated that cell identifiers (such as the NR CGI (Cell Global Identifier) discussed infra) may be used as a basis of location data for the UEe.

Figure 11A:
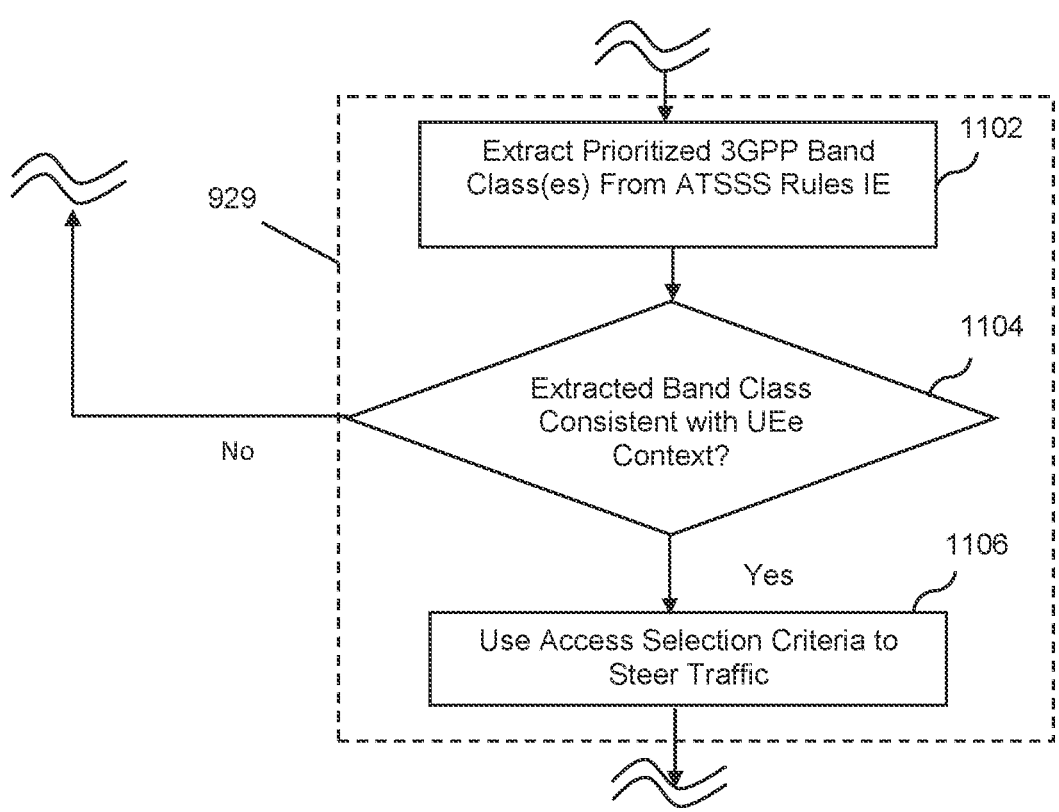
FIG. 11A is a logical flow diagram of one implementation of the method of FIG. 9A, wherein ATSSS Band Class information is used as a basis for rule validity and subsequent traffic steering.

FIG. 11A is a logical flow diagram of one implementation of the method of FIG. 9A, wherein ATSSSe Band Class information is used as a basis for rule validity and subsequent traffic steering. As shown, per step 1102, prioritized band class data is extracted from the ATSSSe rule, and if consistent with the UEe context (e.g., the UEe is utilizing one of the bands listed), then the steering mode and rules data is applied per step 1106s.

Figure 11B:
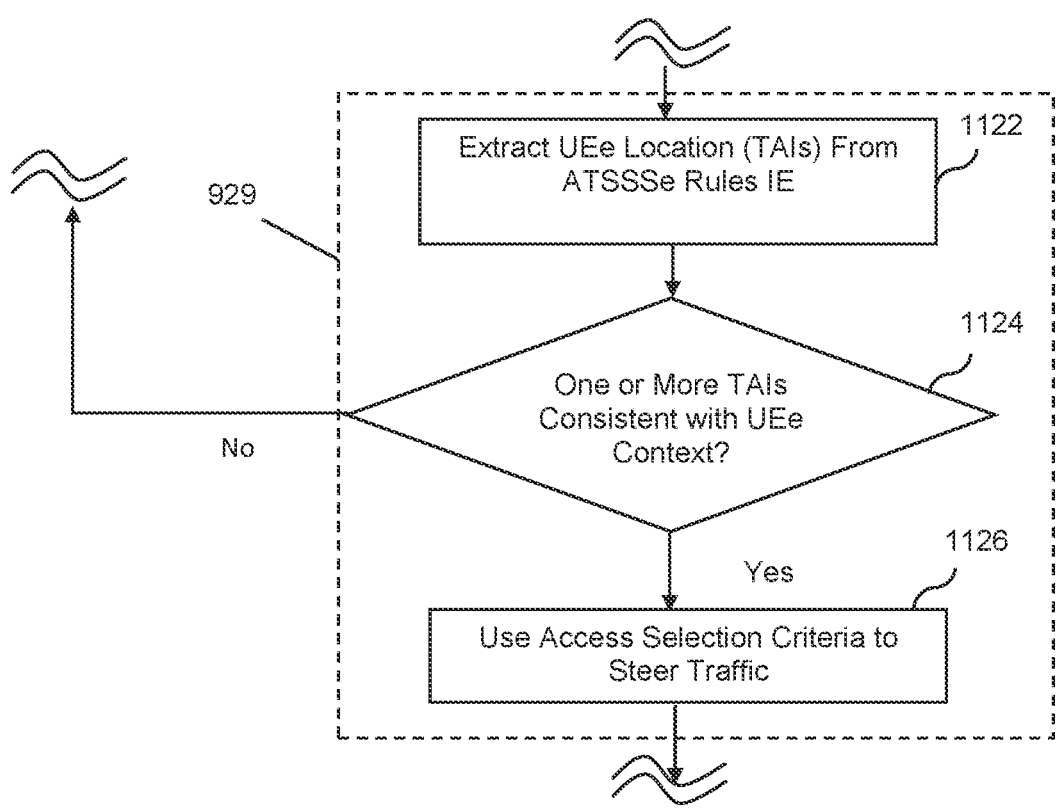
FIG. 11B is a logical flow diagram of another implementation of the method of FIG. 9A, wherein ATSSS UE location information is used as a basis for rule validity and subsequent traffic steering.

FIG. 11B is a logical flow diagram of another implementation of the method of FIG. 9A, wherein ATSSS UE location information is used as a basis for rule validity and subsequent traffic steering. In this example, UEe Location Data from the IE 1002 is used as a basis for determining applicability of the steering mode and functionality data. Specifically, per step 1122, the UEe extracts the location data (e.g., TAIs) from the ATSSSe rules data IE, and based on the TAIs being consistent with the UEe context (e.g., the UEe current TAI being one of the listed TAIs per step 1124), the Access Selection criteria of the rule are applied to steer the relevant traffic.

FIG. 12 is a logical flow diagram illustrating one embodiment of a generalized method for updating route selection logic according to the present disclosure.

Per the method 1200 of FIG. 12, the network (e.g., wireless network infrastructure) obtains data indicative of the user device location per step 1201. This may be via TAI/TAC as previously noted (e.g., for a 3GPP 5GS network), or via other means such as GPS receiver, association with a given access node of the network, etc.

Next, per step 1203, the network maps the user device location to a current frequency band applicable thereto, such as via access of a band/location mapping database.

At step 1205, the network evaluates the location data and frequency band data to determine if steering or route selection logic currently in place for that user device is adequate. If a change or update is required (step 1207), then per step 1209, the network instructs the user device (via e.g., messaging or rules data transmitted thereto) to alter its route selection or steering logic for the prescribed traffic subject thereto.

Figure 12A:
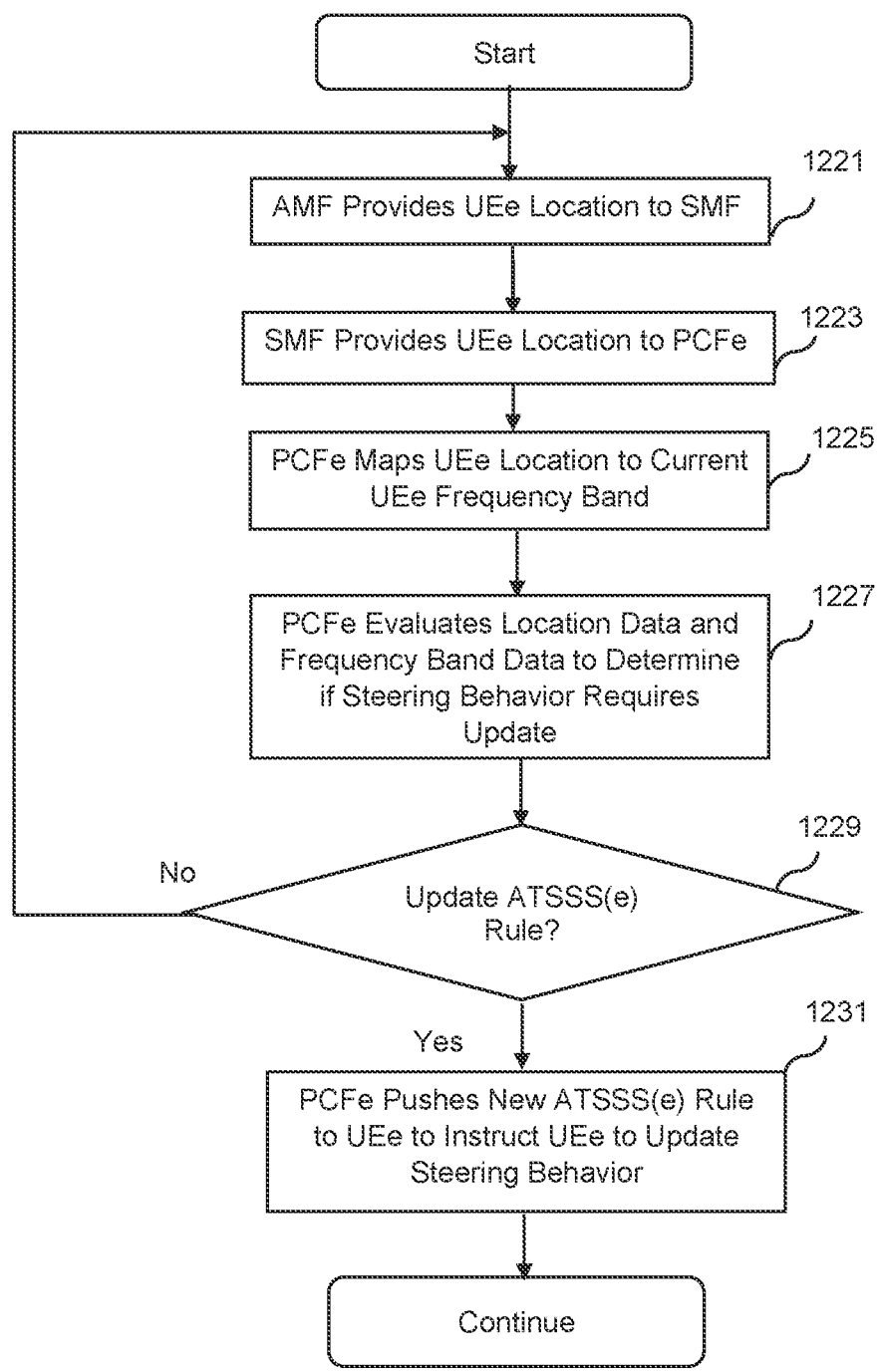
FIG. 12A is a logical flow diagram illustrating one implementation of the generalized method of FIG. 12, wherein a 3GPP PCFe implements ATSSS-based steering functionality updates.

FIG. 12A is a logical flow diagram illustrating one implementation of the generalized method of FIG. 12, wherein a 3GPP PCFe implements ATSSS-based steering functionality updates. In this implementation of the method 1220, a 3GPP 5GS is utilized, and when there is any change in UE's current location, the AMF thereof (see FIG. 1) provides the UEe location to an SMF in data communication therewith (such as via the Namf/N11 interface) per step 1221. As above, this location data may take the form of e.g., TAI or other types of data like CGI.

Next, the SMF forwards the location data for the UEe to the PCFe (see FIG. 14) per step 1223, such as via the N7 interface.

Alternatively, i.e. the PCFe getting the UEe location information from SMF via the AMF, the PCF may get the UEe location changes from the AMFe directly via corresponding Namf interface.

Per step 1225, the PCFe maps the UEe location data to current UEe frequency band(s) in service in that location, and per step 1227, evaluates the mapping to determine if steering behavior for the UEe requires update (e.g., via an updated ATSSSe rule). If so (step 1229), the per step 1231, the PCFe generates and pushes updated policy rules with ATSSSe rule(s) to the SMF, which then forwards it to the AMF, (and ultimately the target UEe via the appropriate gNB/RAN).

It will be appreciated that in the exemplary context of FIG. 12A, the location data referenced in this procedure is the UEe's current location such as may be provided to the PCF (via the AMF/SMF). This location data is unrelated to the exemplary configuration of the "UE Location" field in the ATSSSe Rule (see FIG. 10).

Moreover, in FIG. 12A, at step 1231, the PCFe/SMFe pushes the updated ATSSS Rule(s) to the UEe. These rule(s) may or may not contain the enhancement data 1002 in FIG. 10. Specifically, in this case, the network (e.g., PCFe and/or any other relevant server) has already made the appropriate steering mode decision for the UEe, and therefore there is no need for further validation at the UEe side. Accordingly, in the embodiment of FIG. 12A, the UE may not need the enhancement capability described elsewhere herein (i.e., it may be a traditional UE, or alternatively be an enhanced device (UEe) and simply not utilize the enhancement logic, such as where no enhancement data 1002 is sent.

FIG. 13 is a logical flow diagram illustrating one embodiment of a generalized method for utilizing band selection logic to partition or categorize user devices within a target area, according to the present disclosure.

As shown in FIG. 13, the method 1300 includes first obtaining location data relating to an Nth (N=1 . . . n) user device within a target area by a network process. For example in 3GPP embodiments, the TAI or similar may be used as a basis for determining target area.

Per step 1303, the network determines a priority or subscriber status associated with the Nth user device (e.g., whether the user or account associated with the user device requires differentiated or prioritized treatment). This can be determined via subscription identifiers such as IMSI or via other information relating to the device user (e.g., login or other credentials or authentication) or the mobile device itself. In this context, the decision of whether prioritized treatment is to be applied may be binary in nature ("yes" or "no"), or grades or levels of priority or differentiation may also be applied (e.g., "Gold, Silver, Bronze" classification, ranking from 0-10, etc.). Prioritization or differentiation in this context may be access to certain frequency bands (e.g., those with reduced cost, reduced interference, which meet latency or QoS requirements, etc.).

Per step 1305, the network correlates the Nth user device location to the target area (e.g., to determine whether the subsequent policy or rules will apply, and if applicable, per step 1307, the user device is mapped to a frequency band (or other asset/resource associated with the target area) according to their prioritization or differentiation categorization from step 1303.

Per step 1309, the network then instructs the user device (e.g., UEe) to change band (or other resource) selection logic, such as via an updated URSPe or ATSSSe rule.

Per steps 1311 and 1313, the network process (e.g., PCFe) then iterates throughout all user devices of interest (e.g., UEe that are ostensibly located within a given TAI (or CGI) based on the last Mobility and Registration Update sent from those UE, or AMF's derivation of the UE's current location based on the UE signalling received via N2 of the gNB that UE is connected to). The location information values used to determine the population of UEe may be associated with the target area a priori, such as where a given set of TAI values are associated with a given geographic area or venue of interest, or alternatively determined dynamically.

Network Architecture—

Figure 14:
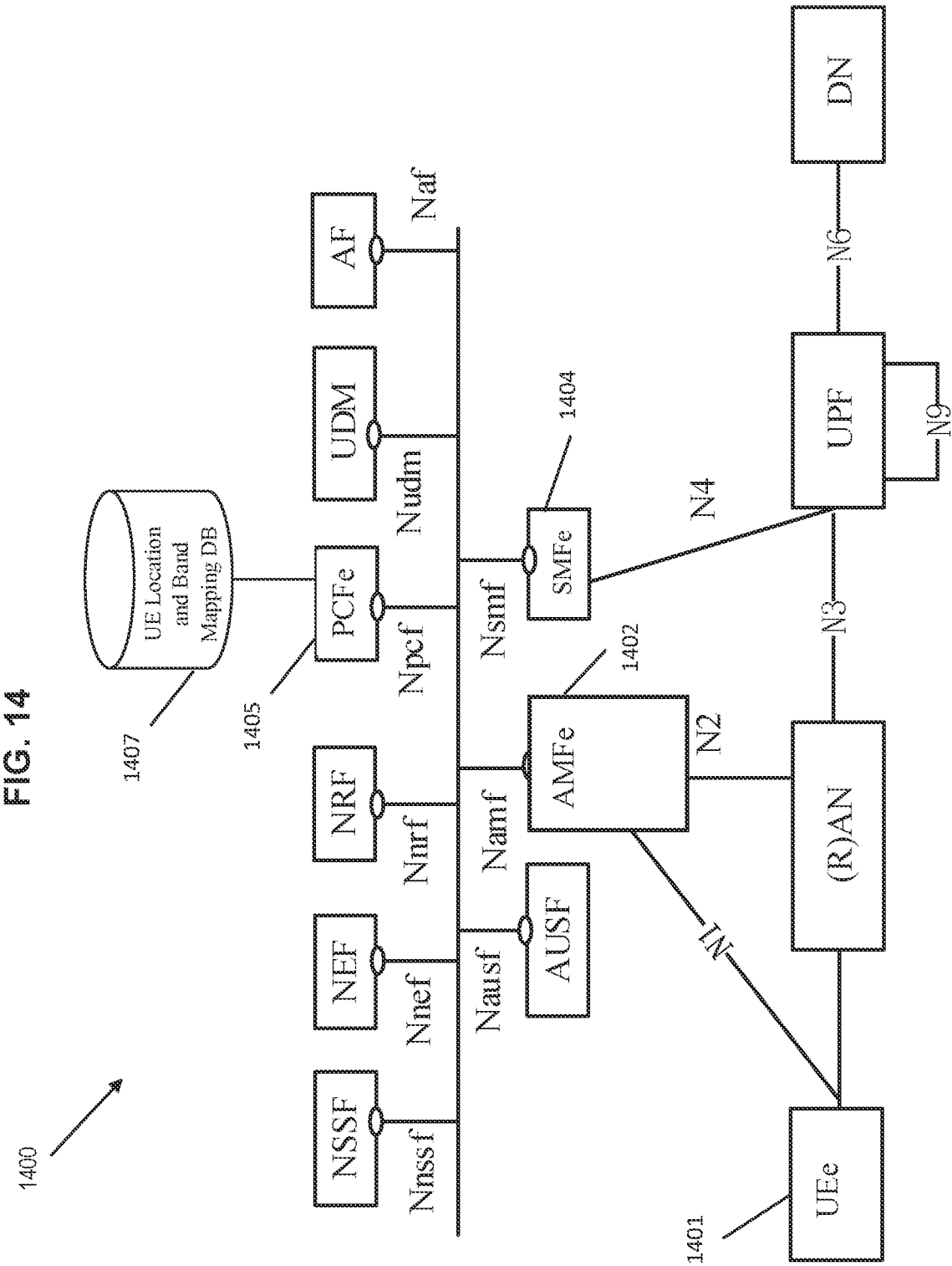
FIG. 14 is a functional block diagram illustrating one exemplary embodiment of an enhanced 5GS architecture and the various components thereof, according to the present disclosure.

FIG. 14 shows one embodiment of a 5GS architecture 1400, including aspects as defined in 3GPP TS 23.501, according to the present disclosure. Specifically, as shown, the architecture 1400 includes a UEe 1401 of the type previously referenced, as well as other enhanced entities including the PCFe 1405, as well as a band mapping and UEe location database 1407 communicative with the PCFe, and optionally AMFe 1402 and SMFe 1404. In various embodiments, some of the logic associated with the various functions and methods described previously herein may be disposed within the AMFe and SMFe processes, or alternatively all of the logic (save that associated with and required to be resident within the UEe) may be located within the PCFe 1405, with prior art SMF and AMF processes used in support thereof.

As a brief aside, in the architecture of FIG. 14, various identifiers are utilized during operation of the network. These include:

the AMF Identifier (AMF ID), which is used to identify a particular AMF (Access and Mobility Management Function);

the NR Cell Global Identifier (NCGI), which is used to identify NR cells globally, and is constructed from the PLMN identity to which the cell belongs, and the NR Cell Identity (NCI) of the cell;

the gNB Identifier (gNB ID) is used to identify gNBs within a PLMN, and is contained within the NCI of its cells;

the Global gNB ID, which is used to identify gNBs globally, and is constructed from the PLMN identity to which the gNB belongs, and the gNB ID;

the Tracking Area identifier (TAI), which is used to identify tracking areas, and is constructed from the PLMN identity to which the tracking area belongs, and the TAC (Tracking Area Code) of the Tracking Area; and the Single Network Slice Selection Assistance information (S-NSSAI), which is used to identify a network slice.

Hence, depending on what data is useful to the PCFe or UEe in constructing or processing the various URSPe and ATSSSe rules previously described herein, various portions of the foregoing can be associated and transmitted to particular UEe as part of their rule set.

Details on the construction of exemplary embodiments of the PCFe 1405 and UEe are described subsequently herein with respect to FIGS. 19 and 20, respectively.

FIG. 15 is a functional block diagram illustrating a first exemplary embodiment of a roaming and non-roaming 3GPP 5GS architecture for enhanced ATSSS (ATSSSe) support according to the present disclosure. The illustrated embodiment the UEe 1401 can obtain access over the user-plane (UP) of the 3GPP access 1506 and/or the user-plane of the non-3GPP access 1508, such access which can be steered or otherwise controlled by the various rules described herein. Specifically, as shown in FIG. 15, the architecture includes additional functionalities in the PCFe 1405 and UEe 1401 to process, store and map the UEe location as well as other parameter such as band usage, according to the present disclosure.

The illustrated AMFe 1402 may in certain embodiments also include a UEe location module, which tracks the UEe location information in support of PCFe rule generation/update functionality. When the UEe location changes (e.g., mobility in moving between TAIs), the new location information will be provided by AMFe to SMFe, and then SMFe to PCFe 1405; or alternatively by AMFe to PCFe. The PCFe includes a UEe location to spectrum band mapping logic module, which inter alia, maps the UEe location provided by SMFe to the associated 3GPP Band Class(es). As previously noted, the PCFe may also include logic whereby the PCFe may instruct the UEe to change the Steering Mode, and/or the "aggressiveness" of steering behavior between 3GPP and non-3GPP accesses 1506, 1508. The ATSSSe steering function logic 1511 in the UEe enables traffic steering, switching and splitting across the 3GPP access and non-3GPP access, in accordance with the enhanced ATSSSe rules provided by the SMFe based on the PCC rules with ATSSSe rules information received from the PCFe.

Similarly, the URSPe logic module 1513 of the UEe includes logic which enables, in the exemplary embodiment, implementation of 3GPP band class prioritization under certain conditions (e.g., when the UEe needs to perform a selection/re-selection of band, and the Access Type specified in its rule(s) is either "3GPP" or "Multi-access.")

FIG. 15 also illustrates a typical service provider network configuration 1520 useful with the features of the enhanced selection/steering apparatus and methods described herein. This service provider network 1520 is used in one embodiment of the disclosure to provide backbone and backhaul from the service provider's service nodes, such as backhauling UP data nodes such as gNBs via HFC cable or FTTC/FTTH drops to different premises or venues/residences. For example, one or more stand-alone or embedded DOC SIS cable modems (CMs; not shown) are in data communication with the various NR architecture components (e.g., gNB) so as to provide two-way data communication to the served components. This connectivity also allows for logical communication between the PCFe 1405 and any MSO or MNO-based network controller functions, such as ones disposed at a headend or hub of the MSO.

In certain embodiments, the service provider network 1520 also advantageously permits the aggregation and/or analysis of subscriber- or account-specific data (including inter alia, particular UEe devices associated with such subscriber or accounts) as part of the provision of services to users under the exemplary delivery models described herein. As one example, device-specific IDs (e.g., IMSI, IMEI, MAC address or the like) can be cross-correlated to MSO subscriber data maintained at e.g., the "home" network head end(s) so as to permit or at least facilitate, among other things, (i) user/device authentication to the MSO network; (ii) correlation of aspects of the area, premises or venue where service is provided to particular subscriber capabilities (including band mapping for MSO-operated nodes), demographics, or equipment locations, such as for delivery of location-specific or targeted content or advertising; and (iii) determination of subscription level, and hence subscriber privileges and access to certain services or steering functionality as applicable. Moreover, device profiles for particular UEe devices can be maintained by the MSO, such that the MSO (or its automated proxy processes) can model the device for wireless or other capabilities.

FIG. 16 is a functional block diagram illustrating a second exemplary embodiment of a roaming with home-routed 3GPP 5GS architecture for ATSSSe support according to the present disclosure.

The illustrated embodiment supports a roaming case with home-routed traffic when the UEe is registered to the same VPLMN over a 3GPP access 1606 and non-3GPP access 1608.

In this architecture, the MPTCP Proxy functionality and the MPF are located in the Home UPF (H-UPF). The AMFe 1602 is located in VPLMN, and the PCFe functionality (H-PCFe 1605) is located in the HPLMN, while the V-SMFe 1604 is also located in the VPLMN.

FIG. 17 is a functional block diagram illustrating a third exemplary embodiment of a roaming with home-routed 3GPP 5GS architecture for ATSSSe support according to the present disclosure.

The illustrated embodiment supports a roaming case with home-routed traffic when the UEe 1401 is registered to VPLMN over the 3GPP access 1706 and to Home Public Land Mobile Network (HPLMN) over the non-3GPP access 1708 (i.e. the UEe is registered to a different PLMN). Specifically, as shown in FIG. 17, the MPTCP Proxy functionality and the PMF are located in the Home UPF (H-UPF). The AMFe 1702 is located in VPLMN, and the H-PCFe 1705 is located in the HPLMN. Advantageously, since standardized 5GS protocols and interfaces are utilized, communication between the various entities of each of FIGS. 15-17 is straightforward (i.e., as opposed to proprietary protocols utilized in each domain).

Figure 18:
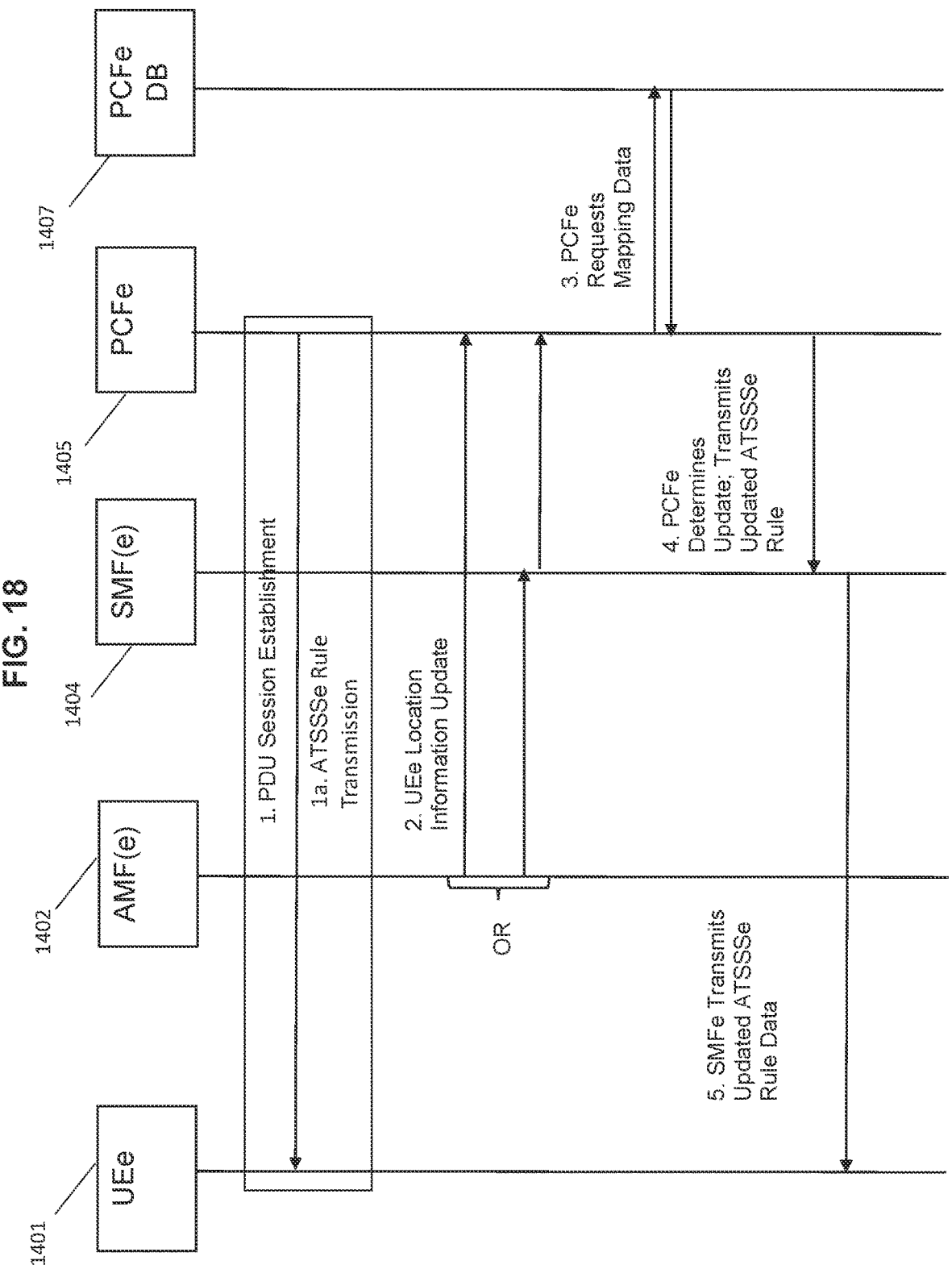
FIG. 18 is a ladder diagram illustrating an exemplary embodiment of communication flow between UEe, AMF, SMF and PCFe (including PCFe UE location and band mapping database) according the present disclosure.

FIG. 18 is a ladder diagram illustrating an exemplary embodiment of communication flow between UEe 1401, AMF(e) 1402, SMF(e) 1404, and PCFe 1405 (including the PCFe UE location and band mapping database 1407) according the present disclosure.

PCFe Apparatus—

Figure 19:
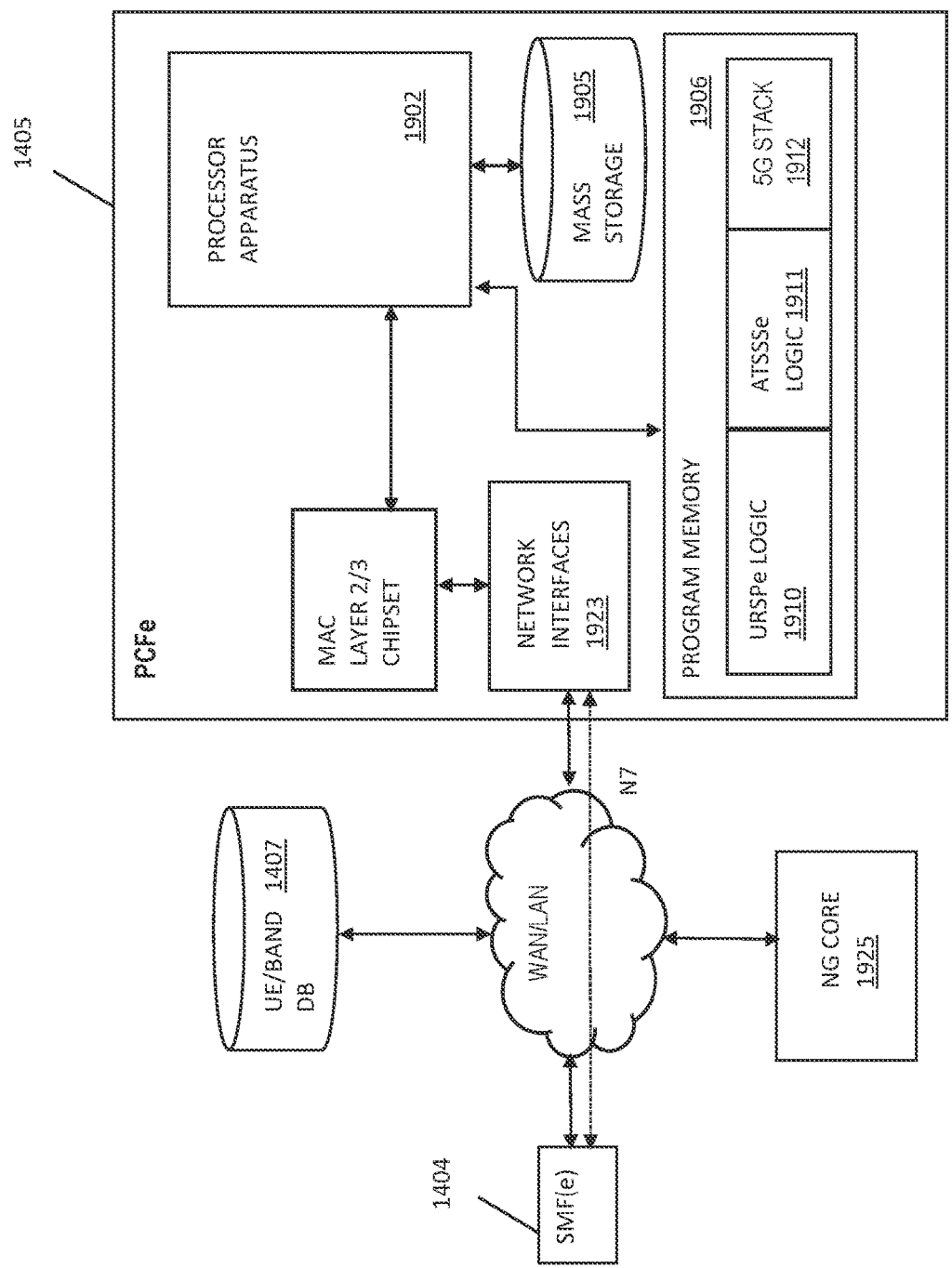
FIG. 19 is a functional block diagram illustrating an exemplary embodiment of an enhanced 3GPP PCF (PCFe) apparatus useful with various embodiments of the present disclosure.

FIG. 19 illustrates a block diagram of an exemplary embodiment of a 5G enabled enhanced PCF (PCFe) apparatus 1405, useful for operation in accordance with the present disclosure.

In one exemplary embodiment as shown, the PCFe 1405 includes, inter alia, a processor apparatus or subsystem 1902, a program memory module 1906, a local mass storage device 1905, and network interfaces 1923 for communications with the relevant 5G-NR RAN or other entities such as the SMF/SMFe 1404 previously described herein, the NG Core (NGC) 1925, and the UEe and band mapping database 1407).

In one embodiment, the processor apparatus 1902 may include one or more of a digital signal processor, microprocessor, field-programmable gate array, GPU, or plurality of processing components mounted on one or more substrates. The processor apparatus 1902 may also comprise an internal cache memory. In addition, the PCFe 1405 may include ATSSSe logic 1910 and URSPe logic 1911 in the program memory which is in communication with the processing subsystem (as well as a 5G stack 1912 to implement other 5GS related functions of the PCFe). In one example, the URSPe and ATSSSe logic maybe implemented as software or firmware stored on a storage device and executed on the processor 1902.

The processing subsystem 1902 is in communication with a program memory module or subsystem 1906, where the latter may include memory which may comprise, e.g., SRAM, flash and/or SDRAM (e.g., GDDR5 or GDDR6) components. The memory module 1906 may implement one or more of direct memory access (DMA) type hardware, so as to facilitate data accesses as is well known in the art. The memory module of the exemplary embodiment contains one or more computer-executable instructions that are executable by the processor apparatus 1902. A mass storage device (e.g., HDD or SSD, or NAND/NOR flash or the like) 1905 is also provided as shown.

The processor apparatus 1902 is configured to execute at least one computer program stored in memory 1906 (e.g., the logic of the URSPe module and/or ATSSSe module according to the methods of FIGS. 5-13A, herein, in the form of software or firmware that implements the various functions). Other embodiments may implement such functionality within dedicated hardware, logic, and/or specialized co-processors (not shown).

In some embodiments, the logic 1910 and 1911 also utilizes memory 1906 or other storage 1905 configured to temporarily and/or locally hold a number of data relating to the various rules, policies, locations, bands, and other data for the various UEe 1401 (whether alone or in cooperation with the database 1407) which it services under the NR standard(s). In other embodiments, application program interfaces (APIs) may also reside in the internal cache or other memory 1906. Such APIs may include common network protocols or programming languages configured to enable communication between with other network entities (e.g., via API "calls" to or from the NG Core or other entities, such as MSO based headend control entities or processes, such as to implement desired frequency spectrum plans or policy changes).

As noted, the PCFe 1405 includes URSPe logic 1910 which is configured to support use the enhanced URSP (USRPe) rules including prioritized frequency spectrum, such as in cases where the Access Type Preference is "3GPP" or "Multi-access." It may also include ATSSSe logic 2011 to support enhanced ATTSSS rules for traffic steering behavior and related functions as described previously herein.

UEe Apparatus—

FIG. 20 illustrates a block diagram of an exemplary embodiment of an enhanced UE (UEe) apparatus 1401, useful for operation in accordance with the present disclosure.

In one exemplary embodiment as shown, the UEe 1401 includes, inter alia, a processor apparatus or subsystem 2002, a program memory module 2006 which includes enhanced URSP (URSPe) logic 2010 and enhanced ATSSS (ATSSSe) logic 2011, as well as a 5G stack 2012 (here each implemented as software or firmware operative to execute on the processor 2002), and wireless radio interface(s) 2005 for communications with the relevant RANs (e.g., 5G-NR RAN). The RF interface front ends 2017 and antennae 2019 are each configured to comply with the relevant PHY standards which it supports. The antenna(s) 2019 of the UE radios may include multiple spatially diverse individual elements in e.g., a MIMO- or MISO-type configuration, such that spatial diversity of the received signals can be utilized. Moreover, a phased array or similar arrangement can be used for spatial resolution within the environment, such as based on time delays associated with signals received by respective elements.

In one embodiment, the processor apparatus 2002 may include one or more of a digital signal processor, microprocessor, field-programmable gate array, GPU, or plurality of processing components mounted on one or more substrates. The processor apparatus 2002 may also comprise an internal cache memory, and modem/baseband chipset 2003. The modem 2003 processes the baseband control and data signals for transmission and reception via the RF frond end module 2017.

As indicated, the UEe includes ATSSSe logic 2011 and URSPe logic 2010 in the program memory, which is in communication with the processing subsystem, where the former may include memory which may comprise, e.g., SRAM, flash and/or SDRAM components. The memory module 2006 may implement one or more of direct memory access (DMA) type hardware, so as to facilitate data accesses as is well known in the art. The memory module of the exemplary embodiment contains one or more computer-executable instructions that are executable by the processor apparatus 2002. A mass storage device (e.g., HDD or SSD, or NAND/NOR flash or the like) is also provided as shown.

Other embodiments may implement the ATSSSe and URSPe functionality within dedicated hardware, logic, and/or specialized co-processors (not shown).

As noted, the URSPe logic 2010 of the exemplary embodiment is configured to use the prioritized 3GPP frequency spectrum allocation if the Access Type Preference is set at 3GPP or Multi-access. Likewise, the ATSSSe logic of the UEe is used to support enhanced ATSSS rule implementations for, inter alia, traffic steering as described herein.

The UEe 1401 may also be configured to utilize positioning location data generated by an internal receiver 2009 (e.g., GPS, GLONASS, or similar, or yet other operating principles) to transmit location data such as coordinates to a gNB, SMF, or other entity (such as the PCFe) in support of location-related functions, although it will be appreciated that the UEe's location can also be derived by network-based means.

In some embodiments, the UEe also utilizes memory 2006 or other storage 2007 configured to at least temporarily hold a number of data relating to the various network associations, band classes, URSPe and ATSSSe policies and rules, and for the traffic services/applications such as voice, etc. in support of the various functions described herein. In other embodiments, application program interfaces (APIs) such as those included in an MSO-provided application or those natively available on the UEe may also reside in the internal cache or other memory 2006. Such APIs may include common network protocols or programming languages configured to enable communication with the UEe 1401 and other network entities.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

APPENDIX A: NR FREQUENCY BANDS AS SPECIFIED IN 3GPP

TABLE 5.2-1

| | NR operating bands in FR1 | | |
|---|---|---|---|
| NR operating band | Uplink (UL) operating band BS receive/UE transmit $F_{UL,\ low}$-$F_{UL,\ high}$ | Downlink (DL) operating band BS transmit/UE receive $F_{DL,\ Low}$-$F_{DL,\ high}$ | Duplex Mode |
| n1 | 1920 MHz-1980 MHz | 2110 MHz-2170 MHz | FDD |
| n2 | 1850 MHz-190 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |

TABLE 5.2-1-continued

NR operating bands in FR1

| NR operating band | Uplink (UL) operating band BS receive/UE transmit $F_{UL, low}$-$F_{UL, high}$ | Downlink (DL) operating band BS transmit/UE receive $F_{DL, Low}$-$F_{DL, high}$ | Duplex Mode |
|---|---|---|---|
| n8 | 880 MHz-915 MHz | 925 MHz-960 MHz | FDD |
| n12 | 699 MHz-716 MHz | 729 MHz-746 MHz | FDD |
| n20 | 832 MHz-862 MHz | 791 MHz-821 MHz | FDD |
| n25 | 1850 MHz-1915 MHz | 1930 MHz-1995 MHz | FDD |
| n28 | 703 MHz-748 MHz | 758 MHz-803 MHz | FDD |
| n34 | 2010 MHz-2025 MHz | 2010 MHz-2025 MHz | TDD |
| n38 | 2570 MHz-2620 MHz | 2570 MHz-2620 MHz | TDD |
| n39 | 1880 MHz-1920 MHz | 1880 MHz-1920 MHz | TDD |
| n40 | 2300 MHz-2400 MHz | 2300 MHz-2400 MHz | TDD |
| n41 | 2496 MHz-2690 MHz | 2496 MHz-2690 MHz | TDD |
| n50 | 1432 MHz-1517 MHz | 1432 MHz-1517 MHz | TDD |
| n51 | 1427 MHz-1432 MHz | 1427 MHz-1432 MHz | TDD |
| n65 | 1920 MHz-2010 MHz | 2110 MHz-2200 MHz | FDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |
| n86 | 1710 MHz-1780 MHz | N/A | SUL |

TABLE 5.2-2

NR operating bands in FR2

| NR operating band | Uplink (UL) and Downlink (DL) operating band BS transmit/receive UE transmit/receive $F_{UL, low}$-$F_{UL, high}$ $F_{DL, Low}$-$F_{DL, high}$ | Duplex Mode |
|---|---|---|
| n257 | 26500 MHz-29500 MHz | TDD |
| n258 | 24250 MHz-27500 MHz | TDD |
| n260 | 37000 MHz-40000 MHz | TDD |
| n261 | 27500 MHz-28350 MHz | TDD |

What is claimed is:

1. A computerized network apparatus for use in a wireless infrastructure, the computerized network apparatus comprising:
   digital processing apparatus;
   at least one data network interface in data communication with the digital processing apparatus; and
   a storage device in data communication with the digital processing apparatus, the storage device comprising a storage medium having at least one computer program, the at least one computer program configured to, when executed on the digital processing apparatus, cause the computerized network apparatus to:
   receive location information relating to a location of a user device;
   determine one or more frequency bands associated with the location;
   identify a traffic steering rule associated with a data traffic class utilized by the user device;
   based at least on the determined one or more frequency bands, determine whether an update or modification to the traffic steering rule is required; and
   cause issuance of an updated or modified steering rule to the user device via the wireless infrastructure.

2. The computerized network apparatus of claim 1, wherein the updated or modified steering rule comprises (i) a 3rd Generation Partnership Project (3GPP) access traffic steering, switching, and splitting (ATSSS) rule, and (ii) data configured to cause the user device to change a steering functionality for data traffic.

3. The computerized network apparatus of claim 2, wherein the steering functionality comprises a degree of sensitivity to steerage of the data traffic between a 3GPP access and a non-3GPP access.

4. The computerized network apparatus of claim 2, wherein the determination of whether the update or modification to the traffic steering rule is required comprises an algorithmic analysis of whether use of another steering functionality would increase at least one aspect of performance associated with at least one of a transmission or receipt of the data traffic.

5. The computerized network apparatus of claim 1, wherein:
   the receipt of the location information relating to the location of the user device comprises utilization of a location tracker apparatus to track the location of the user device; and
   the determination of the one or more frequency bands associated with the location comprises utilization of at least a portion of the location information to map the location to the one or more frequency bands.

6. A computerized method for categorizing of a plurality of user devices within a prescribed geographic area, comprising:
   determining a need to achieve load balancing across different 3rd Generation Partnership Project (3GPP) bands within the prescribed geographic area;
   obtaining location data respectively associated with the plurality of user devices;
   utilizing the respective location data to correlate respective locations of at least a portion of the plurality of user devices to the prescribed geographic area;
   determining respective statuses of at least the portion of the plurality of user devices, the respective statuses indicative of respective priorities associated with the least portion of the plurality of user devices;
   based at least on the correlation and the respective priorities associated with the least portion of the plurality of user devices, determining that one or more of the at least portion of the plurality of user devices require a modification to one or more respective frequency band selection policies thereof; and
   causing at least the portion of the plurality of user devices to implement the modification of the one or more respective frequency band selection policies thereof.

7. The computerized method of claim 6, further comprising determining a need to achieve a goal relating to user experience for certain tiers of subscribers of a managed content distribution network, the subscribers comprising users of the plurality of user devices.

8. The computerized method of claim 6, further comprising mapping the least portion of the plurality of user devices to one or more frequency bands in accordance with the respective priorities associated therewith.

9. Computer readable apparatus comprising a non-transitory storage medium, the non-transitory storage medium comprising at least one computer program having a plurality of instructions, the plurality of instructions configured to, when executed on a processing apparatus of a computerized network apparatus of a wireless network, cause the computerized network apparatus to:

obtain location data associated with one or more computerized client devices;

based at least on the location data, generate policy data; and transmit the policy data to the one or more computerized client devices, the transmitted policy data configured to cause selective utilization by the one or more computerized client devices of at least one of a plurality of options for one or more prescribed functions;

wherein the selective utilization comprises an instruction to the one or more computerized client devices to perform at least one of: (i) a change to a steering mode thereof, or (ii) modification of an implementation of a steering process thereof.

10. The computer readable apparatus of claim 9, wherein the policy data comprises an Access Traffic Steering, Switching and Splitting (ATSSS) rule selection information element (IE) having one or more fields, the one or more fields enabling the one or more computerized client devices to determine band class priority.

11. Computerized network apparatus for use within a wireless network, comprising:

digital processing apparatus;

at least one wireless network interface in data communication with the digital processing apparatus; and a storage device in data communication with the digital processing apparatus, the storage device comprising a storage medium having at least one computer program, the at least one computer program configured to, when executed on the digital processing apparatus, cause the computerized network apparatus to:

obtain location data associated with a plurality of computerized client devices;

utilize the location data to partition at least a portion of the plurality of computerized client devices within a common geographical area to use respective different Third Generation Partnership Project (3GPP) band classes;

based at least on the location data, generate policy data; and transmit the policy data to the at least portion of the plurality of computerized client devices, the transmitted policy data configured to cause selective utilization by the at least portion of the plurality of computerized client devices of at least one of a plurality of options for one or more prescribed functions.

12. The computerized network apparatus of claim 11, wherein the partition is utilized to achieve load balancing across different 3GPP bands within the common geographical area.

13. The computerized network apparatus of claim 11, wherein the partitioning utilized to achieve a prescribed goal relating to user experience for certain tiers of subscribers or users of the wireless network.

14. The computerized network apparatus of claim 11, wherein the policy data comprises an information element (IE) having one or more fields, the one or more field enabling the at least portion of the plurality of computerized client devices to determine band class priority.

15. The computerized network apparatus of claim 11, wherein IE comprises a route selection IE associated with a Third Generation Partnership Project (3GPP) Universal Software Radio Peripheral (USRP) function.

16. The computerized network apparatus of claim 15, wherein IE comprises an Access Traffic Steering, Switching and Splitting (ATSSS) rule selection IE.

17. The computerized network apparatus of claim 11, wherein the computerized network apparatus comprises a Third Generation Partnership Project (3GPP)-compliant policy control function (PCF).

18. The computerized network apparatus of claim 11, wherein the computerized network apparatus comprises a Third Generation Partnership Project (3GPP) Fifth Generation System (5GS) gNB.

19. The computerized network apparatus of claim 11, wherein the wireless network is operated by a multiple systems operator (MSO), and is configured to utilize at least a quasi-licensed and unlicensed spectrum.

20. The computerized network apparatus of claim 11, wherein the selective utilization comprises utilization of a prioritized list of a plurality of frequency bands based on at least one of (i) a selection policy or (ii) the location data associated with the at least portion of the plurality of computerized client devices.

* * * * *